US012700197B2

(12) United States Patent
Lim et al.

(10) Patent No.: US 12,700,197 B2
(45) Date of Patent: Aug. 4, 2026

(54) WEARABLE DEVICE FOR PROCESSING AUDIO SIGNAL BASED ON EXTERNAL OBJECT RECOGNIZED FROM IMAGE AND METHOD THEREOF

(71) Applicant: SAMSUNG ELECTRONICS CO., LTD., Suwon-si (KR)

(72) Inventors: Minkyung Lim, Suwon-si (KR); Donghyun Yeom, Suwon-si (KR); Jungjik Lee, Suwon-si (KR); Sungoh Kim, Suwon-si (KR); Dasom Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 89 days.

(21) Appl. No.: 18/742,073

(22) Filed: Jun. 13, 2024

(65) Prior Publication Data

US 2025/0069338 A1    Feb. 27, 2025

Related U.S. Application Data

(63) Continuation of application No. PCT/KR2024/007278, filed on May 29, 2024.

(30) Foreign Application Priority Data

Aug. 21, 2023    (KR) ........................ 10-2023-0109424
Oct. 26, 2023    (KR) ........................ 10-2023-0145121

(51) Int. Cl.
*G06T 19/00*        (2011.01)
*G02B 27/01*        (2006.01)

(52) U.S. Cl.
CPC ........ *G06T 19/006* (2013.01); *G02B 27/0172* (2013.01); *G02B 2027/0178* (2013.01)

(58) Field of Classification Search
None
See application file for complete search history.

(56) References Cited

U.S. PATENT DOCUMENTS 9,668,073 B2    5/2017  Das et al.
11,032,532 B2    6/2021  Enriquez et al.
(Continued)

FOREIGN PATENT DOCUMENTS

KR            101899021 B1    9/2018
KR        20210117654 A    9/2021
(Continued)

OTHER PUBLICATIONS

International Search Report and Written Opinion corresponding to Application No. PCT/KR2024/007278; Dated Sep. 19, 2024.

*Primary Examiner* — Talha M Nawaz
(74) *Attorney, Agent, or Firm* — CANTOR COLBURN LLP

(57)        ABSTRACT

According to an embodiment, a processor of a wearable device obtains, while displaying a first screen with respect to a virtual space on an entire displaying region of a display, an audio signal including sound of an external space by using one or more microphones. The processor identifies, in response to detection of an external object generating the sound by using the audio signal, data corresponding to the external object in information associated with the external space obtained based on the camera. The processor, based on identifying the data in the information, displays, together with the first screen in the displaying region, a second screen including a portion segmented from an image obtained from the camera based on the identified data.

20 Claims, 17 Drawing Sheets

(56)　　　References Cited

U.S. PATENT DOCUMENTS

| | | | |
|---|---|---|---|
| 2019/0221035 A1 | 7/2019 | Clark et al. | |
| 2022/0197028 A1* | 6/2022 | Choi | G06V 20/47 |
| 2022/0230649 A1 | 7/2022 | Kim et al. | |
| 2022/0239269 A1 | 7/2022 | Min et al. | |
| 2022/0292790 A1 | 9/2022 | Lohr et al. | |
| 2023/0080909 A1 | 3/2023 | Tomczek | |
| 2023/0145966 A1* | 5/2023 | Jeong | H04S 7/40 |
| | | | 704/270 |

FOREIGN PATENT DOCUMENTS

| | | | |
|---|---|---|---|
| KR | 20220106643 A | 7/2022 |
| KR | 102531655 B1 | 5/2023 |
| KR | 102535252 B1 | 5/2023 |
| WO | 2022158854 A1 | 7/2022 |

* cited by examiner

RECOGNIZE ONE OR MORE EXTERNAL OBJECTS
BY USING AT LEAST ONE CAMERA — 310

STORE OBJECT INFORMATION (E.G., LOCATION AND/OR
SOUND THAT MAY OCCUR FROM EXTERNAL OBJECT) ON
ONE OR MORE EXTERNAL OBJECTS — 315

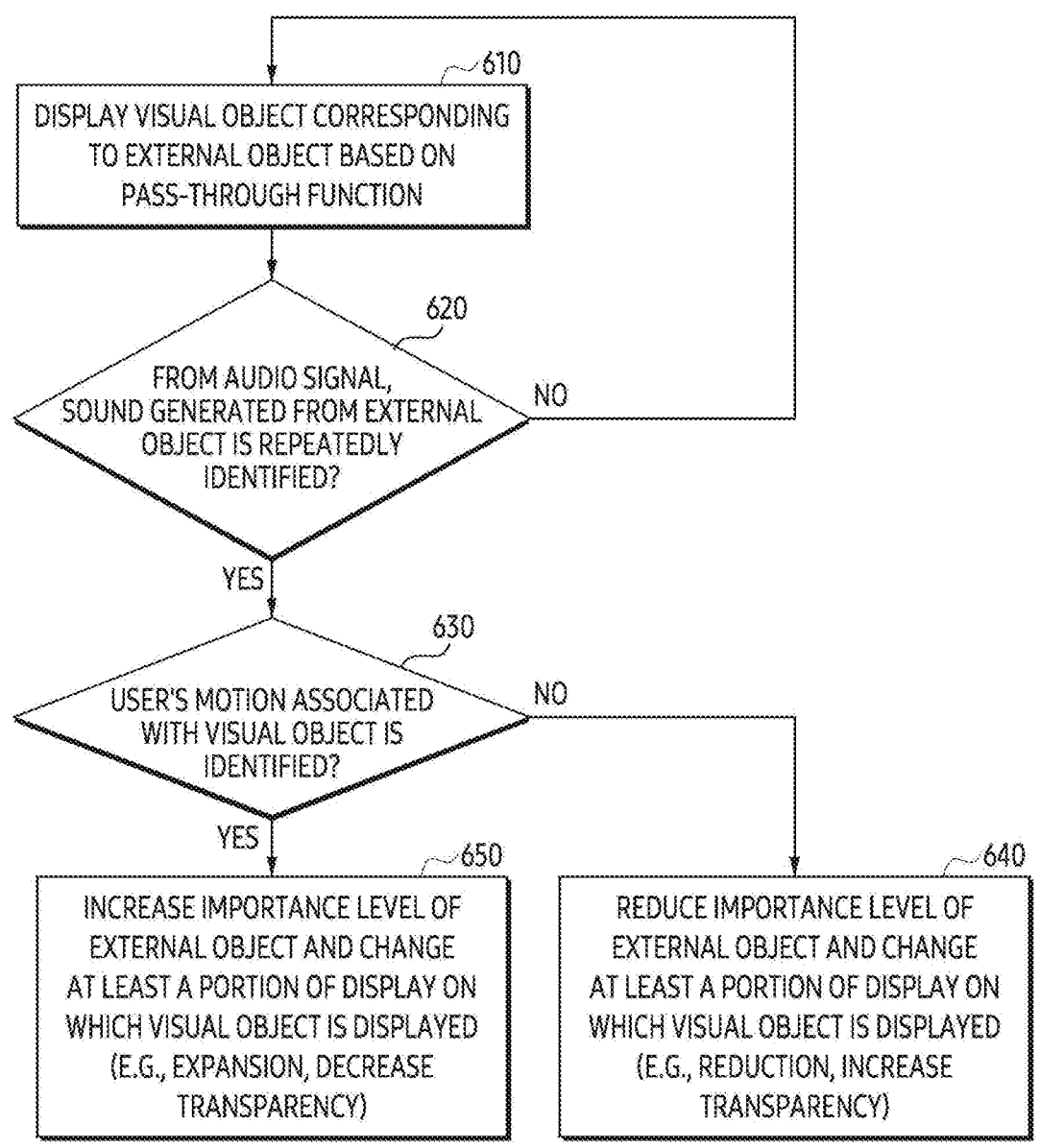

610
DISPLAY VISUAL OBJECT CORRESPONDING TO EXTERNAL OBJECT BASED ON PASS-THROUGH FUNCTION

620
FROM AUDIO SIGNAL, SOUND GENERATED FROM EXTERNAL OBJECT IS REPEATEDLY IDENTIFIED?

NO

YES

630
USER'S MOTION ASSOCIATED WITH VISUAL OBJECT IS IDENTIFIED?

NO

YES

650
INCREASE IMPORTANCE LEVEL OF EXTERNAL OBJECT AND CHANGE AT LEAST A PORTION OF DISPLAY ON WHICH VISUAL OBJECT IS DISPLAYED (E.G., EXPANSION, DECREASE TRANSPARENCY)

640
REDUCE IMPORTANCE LEVEL OF EXTERNAL OBJECT AND CHANGE AT LEAST A PORTION OF DISPLAY ON WHICH VISUAL OBJECT IS DISPLAYED (E.G., REDUCTION, INCREASE TRANSPARENCY)

FIG. 6

WEARABLE DEVICE FOR PROCESSING AUDIO SIGNAL BASED ON EXTERNAL OBJECT RECOGNIZED FROM IMAGE AND METHOD THEREOF

CROSS-REFERENCE TO RELATED APPLICATIONS

This application is a continuation of International Application No. PCT/KR2024/007278 designating the United States, filed on May 29, 2024, in the Korean Intellectual Property Receiving Office and claiming priority to Korean Patent Application Nos. 10-2023-0109424, filed on Aug. 21, 2023, and 10-2023-0145121, filed on Oct. 26, 2023, in the Korean Intellectual Property Office, the disclosures of each of which are incorporated by reference herein in their entireties.

TECHNICAL FIELD

The present disclosure relates to a wearable device for processing an audio signal based on an external object recognized from an image and a method thereof.

BACKGROUND ART

In order to provide an enhanced user experience, an electronic device that provides an augmented reality (AR) service that displays information generated by a computer in association with an external object in the real-world is being developed. The electronic device may be a wearable device that may be worn by a user. For example, the electronic device may be AR glasses and/or a head-mounted device (HMD).

The above-described information may be provided as a related art for the purpose of helping understand the present disclosure. No argument or decision is made as to whether any of the above-described content may be applied as a prior art associated with the present disclosure.

SUMMARY

According to an embodiment, a wearable device may comprise a camera, one or more microphones, a display, memory comprising one or more storage medium storing instructions, and at least one processor. The at least one processor may comprise processing circuitry, wherein the instructions, when executed by the at least one processor individually and/or collectively, cause the wearable device to obtain, while displaying a first screen with respect to a virtual space on an entire displaying region of the display, an audio signal including sound of an external space by using the one or more microphones. The instructions, when executed by the at least one processor individually and/or collectively, cause the wearable device to identify, in response to detection of an external object generating the sound by using the audio signal, data corresponding to the external object in information associated with the external space obtained based on the camera. The instructions, when executed by the at least one processor individually and/or collectively, cause the wearable device to, based on identifying the data in the information, display, together with the first screen in the displaying region, a second screen including a portion segmented from an image obtained from the camera based on the identified data.

According to an embodiment, a method of a wearable device may comprise obtaining, while displaying a first screen with respect to a virtual space on an entire displaying region of a display of the wearable device, an audio signal including sound of an external space by using one or more microphones. The method may comprise identifying, in response to detection of an external object generating the sound by using the audio signal, data corresponding to the external object in information associated with the external space obtained based on a camera of the wearable device. The method may comprise, based on identifying the data in the information, displaying, together with the first screen in the displaying region, a second screen including a portion segmented from an image obtained from the camera based on the identified data.

According to an embodiment, a wearable device may comprise a camera, one or more microphones, a display, memory, and at least one processor. The at least processor may comprise processing circuitry, wherein the instructions, when executed by the at least one processor individually and/or collectively, cause the wearable device to display a first screen based on a virtual reality (VR) in an entire displaying region of the display in a state obtaining information corresponding to a plurality of external objects by using the camera. The instructions, when executed by the at least one processor individually and/or collectively, cause the wearable device to obtain an audio signal by using the one or more microphones while displaying the first screen. The instructions, when executed by the at least one processor individually and/or collectively, cause the wearable device to, in response to detection of sound generated from a first external object among the plurality of external objects by using the audio signal, display, together with the first screen, a second screen including a first portion segmented from the image obtained from the camera based on a first size set to correspond to the first external object by the information. The instructions, when executed by the at least one processor individually and/or collectively, cause the wearable device to, in response to detection of sound generated from a second external object among the plurality of external objects by using the audio signal, display, together with the first screen, a third screen including a second portion segmented from the image based on a second size set to correspond to the second external object by the information.

According to an embodiment, a method of a wearable device may comprise displaying a first screen based on a virtual reality in an entire displaying region of the display of the wearable device in a state obtaining information corresponding to a plurality of external objects by using the camera of the wearable device. The method may comprise obtaining an audio signal by using the one or more microphones of the wearable device while displaying the first screen. The method may comprise, in response to detection of sound generated from a first external object among the plurality of external objects by using the audio signal, displaying, together with the first screen, a second screen including a first portion segmented from the image obtained from the camera based on a first size set to correspond to the first external object by the information. The method may comprise, in response to detection of sound generated from a second external object among the plurality of external objects by using the audio signal, displaying, together with the first screen, a third screen including a second portion segmented from the image based on a second size set to correspond to the second external object by the information.

A non-transitory computer-readable recording medium according to an embodiment of the present disclosure may store at least one command and/or instructions that, when executed, cause the electronic device to perform one or more of the above-described methods or operations of the electronic device.

BRIEF DESCRIPTION OF THE DRAWINGS

FIG. 6 illustrates an example of a flowchart of a wearable device according to an embodiment.

DETAILED DESCRIPTION

Figure 1:
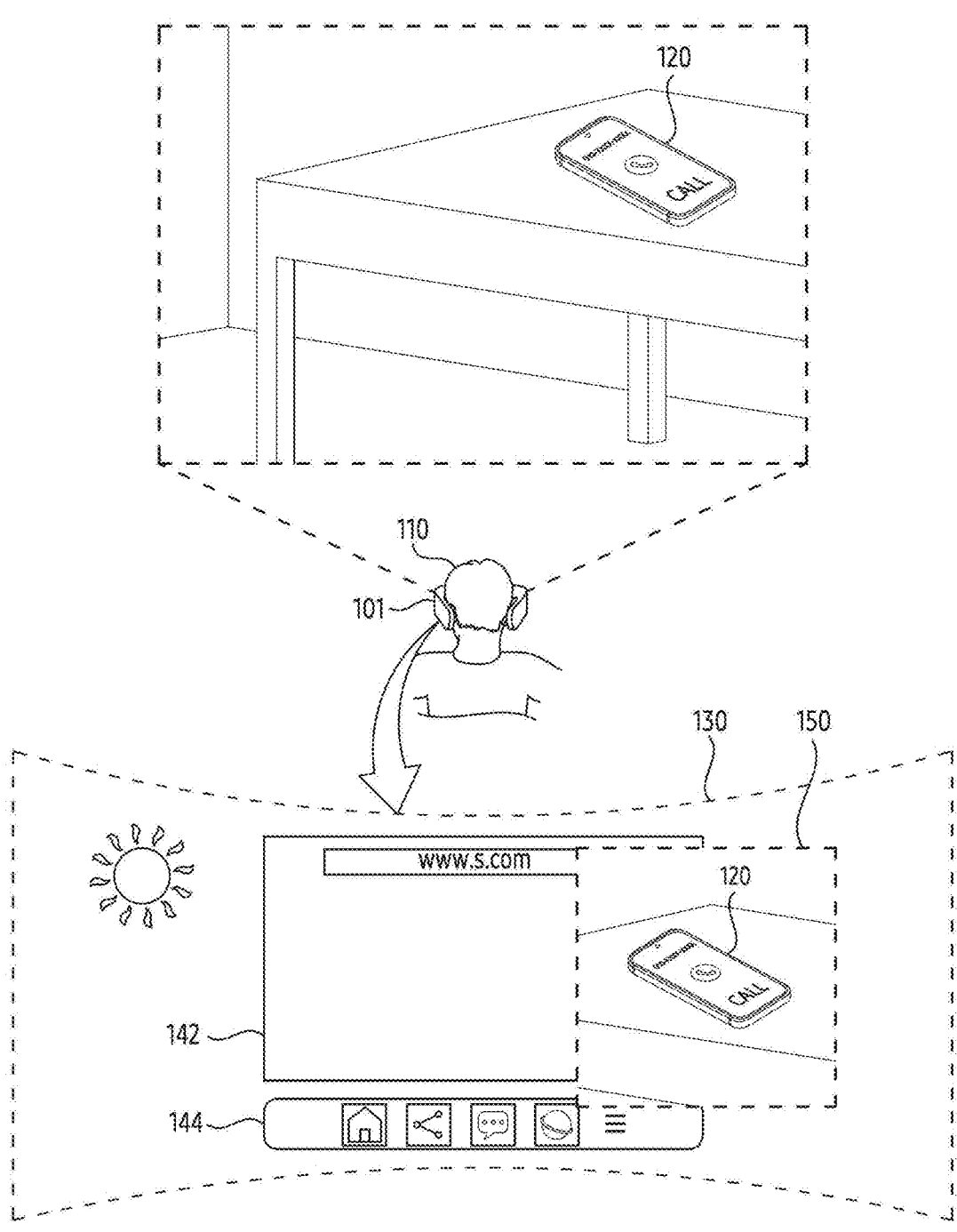
FIG. 1 illustrates an example of a user interface (UI) displayed by a wearable device that recognized sound generated in an external space.

Hereinafter, various embodiments of the present document will be described with reference to the accompanying drawings.

The various embodiments of the present document and terms used herein are not intended to limit the technology described in the present document to specific embodiments, and should be understood to include various modifications, equivalents, or substitutes of the corresponding embodiment. In relation to the description of the drawings, a reference numeral may be used for a similar component. A singular expression may include a plural expression unless it is clearly meant differently in the context. In the present document, an expression such as "A or B", "at least one of A and/or B", "A, B or C", or "at least one of A, B and/or C", and the like may include all possible combinations of items listed together. Expressions such as "1st", "2nd", "first" or "second", and the like may modify the corresponding components regardless of order or importance, is only used to distinguish one component from another component, but does not limit the corresponding components. When a (e.g., first) component is referred to as "connected (functionally or communicatively)" or "accessed" to another (e.g., second) component, the component may be directly connected to the other component or may be connected through another component (e.g., a third component).

The term "module" used in the present document may include a unit configured with hardware, software, or firmware, and may be used interchangeably with terms such as logic, logic block, component, or circuit, and the like, for example. The module may be an integrally configured component or a minimum unit or part thereof that performs one or more functions. For example, a module may be configured with an application-specific integrated circuit (ASIC).

FIG. 1 illustrates an example of a user interface (UI) displayed by a wearable device 101 that recognized sound generated in an external space. The wearable device 101 may include a head-mounted display (HMD) that is wearable on the head of a user 110. The wearable device 101 may be referred to as the head-mount device (HMD), a headgear electronic device, a glasses-type (or goggle-type) electronic device, a video see-through or visual see-through (VST) device, an extended reality (XR) device, a virtual reality (VR) device, and/or an augmented reality (AR) device. Although appearance of the wearable device 101 having a form of glasses is illustrated, the embodiment is not limited thereto. An example of a hardware configuration included in the wearable device 101 will be exemplarily described with reference to FIG. 2. An example of the structure of the wearable device 101 wearable on the head of the user 110 head will be described with reference to FIGS. 8A, 8B, 9A and/or 9B. The wearable device 101 may be referred to as an electronic device. For example, the electronic device may form the HMD, by being combined with an accessory (e.g., a strap) for being attached to the head of the user 110.

According to an embodiment, the wearable device 101 may execute a function associated with augmented reality (AR) and/or mixed reality (MR). For example, in a state in which the user 110 wears the wearable device 101, the wearable device 101 may include at least one lens disposed adjacent to the user's eyes. The wearable device 101 may combine light emitted from a display of the wearable device 101 with ambient light passing through a lens. A displaying region of the display may be formed in the lens through which the ambient light passes. Since the wearable device 101 combines the ambient light and the light emitted from the display, the user 110 may see an image in which a real object recognized by the ambient light and a virtual object formed by the light emitted from the display are mixed. The augmented reality, the mixed reality, and/or the virtual reality described above may be referred to as extended reality (XR).

According to an embodiment, the wearable device 101 may execute a function associated with the video see-through or visual see-through (VST) and/or the virtual reality (VR). For example, in the state in which the user 110 wears the wearable device 101, the wearable device 101 may include a housing covering the eyes of the user 110. The wearable device 101 may include a display disposed on a first surface of the housing facing the eye in the state. The wearable device 101 may include a camera (e.g., a camera 860 of FIGS. 8A to 9B) disposed on a second surface opposite to the first surface. Using the camera, the wearable device 101 may obtain an image and/or video representing the ambient light. The wearable device 101 may output the image and/or video in the display disposed on the first surface so that the user 110 recognizes the ambient light through the display. The displaying area or displaying region (or active area or active region) of the display disposed on the first surface may be formed by one or more pixels included in the display. The wearable device 101 may synthesize the virtual object with the image and/or video outputted through the display so that the user 110 recognizes the virtual object together with the real object recognized by the ambient light.

Referring to FIG. 1, an exemplary state of the wearable device 101 displaying a screen 130 based on the virtual reality is illustrated. The wearable device 101 may provide a virtual space independent of the external space by using one or more displays covering the eyes of the user 110. For example, the wearable device 101 may display the screen 130 for the virtual space that is disassociated with the external space in the entire active region of the one or more displays. The virtual space provided by the wearable device 101 may occupy the entire display of the wearable device 101 in order to provide an immersive media such as a virtual reality game.

Referring to FIG. 1, in the screen 130, the wearable device 101 may display one or more virtual objects 142 and 144 that may respond to motion of the user 110 (e.g., the user's gaze and/or hand gesture). For example, the wearable device 101 may display a virtual object 142 having a form of a window (or activity) provided from the software application based on execution of the software application. For example, the wearable device 101 may display a virtual object 144 (e.g., an application tray) including a list of software applications installed on the wearable device 101. Together with the one or more virtual objects 142 and 144, the wearable device 101 may display a background virtual object occupying the remaining entire displaying region of the display (a landscape image including the sun in the exemplary screen 130 of FIG. 1).

While the wearable device 101 displays the screen 130 based on the virtual reality on the entire displaying region of the display, the user 110 wearing the wearable device 101 may not recognize the external space. According to an embodiment, the wearable device 101 may recognize one or more external objects included in the external space based on scene understanding (SU). The wearable device 101 may perform the scene understanding (SU) by using one or more cameras disposed toward the external space. Based on the scene understanding (SU), the wearable device 101 may generate or store information on the one or more external objects. The information generated based on the scene understanding (SU) may be used to provide a notification associated with the external space to the user 110 who recognizes the virtual reality disconnected from the external space based on the screen 130. An operation of performing the scene understanding (SU) by the wearable device 101 will be described with reference to FIGS. 3A and/or 4.

Referring to FIG. 1, an exemplary external space including a user terminal 120 (e.g., a mobile phone such as a smartphone) is illustrated. The wearable device 101 may recognize or identify the user terminal 120 based on the scene understanding (SU). The user terminal 120 may output sound (e.g., bell sound) for notifying reception of the signal in response to a signal for call establishment. While displaying the screen 130 for the virtual space that is disassociated with the external space on the entire displaying region of the display, the wearable device 101 may obtain an audio signal including sound of the external space by using one or more microphones. The wearable device 101 may detect an external object that generates the sound by using the audio signal. For example, the wearable device 101 may identify or recognize that the bell sound is outputted from the user terminal 120 based on the sound included in the audio signal.

In response to detecting the external object (the user terminal 120 in the exemplary state of FIG. 1) generating the sound, the wearable device 101 may identify data corresponding to the external object in information (e.g., information based on the scene understanding (SU)) associated with the external space obtained based on the camera. For example, the wearable device 101 may check whether the external object outputting the sound included in the audio signal is an external object recognized based on the scene understanding (SU). In case that data corresponding to an external object outputting sound included in the audio signal is included in information obtained based on the scene understanding (SU), the wearable device 101 may display a UI for notifying the generation of the sound on the screen 130.

Referring to FIG. 1, the wearable device 101 recognizing the sound generated from the user terminal 120 may display an image and/or video associated with the external space including the user terminal 120 in the screen 130 based on the virtual reality. For example, based on identifying data associated with the user terminal 120 corresponding to the sound in the information based on the scene understanding (SU), the wearable device 101 may display a portion 150 segmented from the image (or video) obtained from the camera based on the identified data, together with the screen 130 in the displaying region of the display. Referring to FIG. 1, since the portion 150 of the image corresponding to the user terminal 120 is displayed, the user 110 wearing the wearable device 101 may see the user terminal 120 outputting the sound through the portion 150. For example, through the portion 150, the user 110 wearing the wearable device 101 may see the external space including the user terminal 120.

Referring to FIG. 1, the portion 150 displayed together with the screen 130 based on the virtual reality may correspond to an image and/or video for the external space. The portion 150 displayed together with the screen 130 based on the virtual reality may be referred to as a pass-through region and/or a punched region. A function of displaying the portion 150 corresponding to the external space together with the screen 130 based on the virtual reality may be referred to as a pass-through function. According to an embodiment, the wearable device 101, like the user terminal 120, may execute the pass-through function based on identifying an external object that is outputting the sound. Based on the pass-through function, the wearable device 101 may notify the user 110 wearing the wearable device 101 of the generation of the sound and a source of the sound.

According to an embodiment, the wearable device 101 may determine a location of the pass-through region (e.g., the portion 150) in the screen 130 by using information on the external object obtained based on the scene understanding (SU). In a state of identifying data for the user terminal 120 outputting the sound, the wearable device 101 may determine a location and/or size of the portion 150 corresponding to the user terminal 120 in the image and/or video by using a location of the user terminal 120 with respect to the wearable device 101 identified based on the data. The wearable device 101 may display the portion 150 segmented from the image and/or video based on the determined location and/or size, together with the screen 130. The location of the portion 150 displayed on the screen 130 may be associated with the location of the user terminal 120 with respect to the wearable device 101. An operation in which the wearable device 101 displays the portion 150 together with the screen 130 will be described with reference to FIGS. 3B to 3C, and FIGS. 5A to 5E.

The form (e.g., location, size, and/or opacity (or transparency)) of the portion 150 of the image and/or video of the external space displayed together with the screen 130 based on the virtual reality may be associated with the external object (e.g., the user terminal 120) associated with the portion 150 and/or an importance level of sound causing the display of the portion 150. The information generated based on the scene understanding (SU) may include an importance level corresponding to the external object. The wearable device 101 may determine the importance level of the sound based on class (or type and/or category) of the sound identified from the audio signal. The portion 150 displayed together with the screen 130 may have a size corresponding to an importance level matched to the user terminal 120 in the information based on the scene understanding (SU). An operation in which the wearable device 101 adjusts the size of the portion 150 based on the importance level will be described with reference to FIGS. 5A to 5E.

As described above, according to an embodiment, the wearable device 101 may check an external object corresponding to the sound generated in the external space based on the scene understanding (SU). The wearable device 101 may provide a notification UI (e.g., the pass-through region such as the portion 150) based on the external object and/or the sound together with the screen 130 based on the virtual reality. The user 110 wearing the wearable device 101 may recognize an event (e.g., the bell sound outputted from the user terminal 120) generated in the external space while recognizing the virtual reality disconnected from the external space based on the notification UI. The wearable device 101 may prevent the user 110 from omitting an event generated in the external space by using the notification UI.

Hereinafter, an example of a hardware configuration included in the wearable device 101 will be described with reference to FIG. 2.

Figure 2:
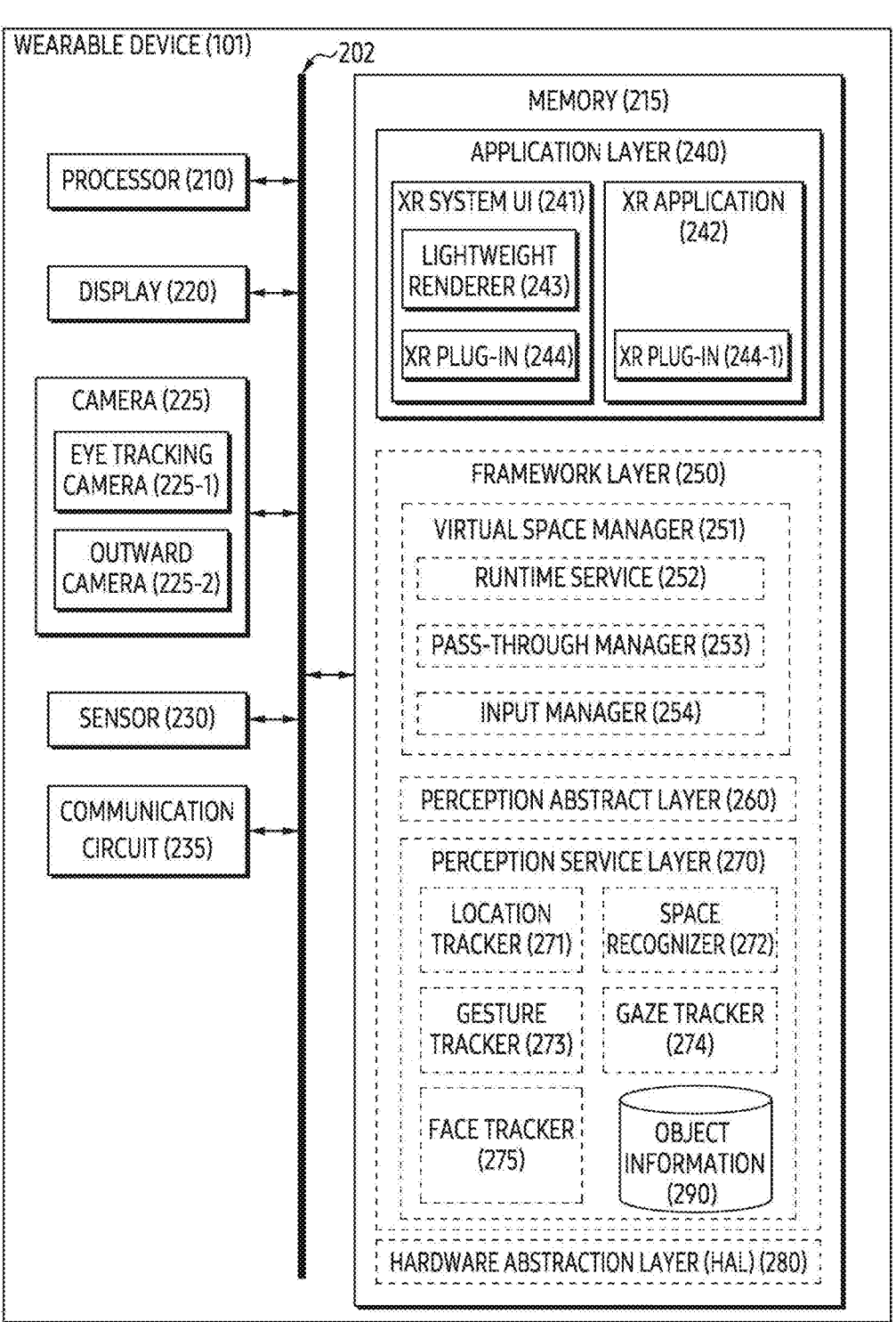
FIG. 2 illustrates an example of a block diagram of a wearable device according to an embodiment.

FIG. 2 illustrates an example of a block diagram of a wearable device 101 according to an embodiment. The wearable device 101 of FIG. 1 may at least partially include a hardware configuration of the wearable device 101 described with reference to FIG. 2.

Referring to FIG. 2, the wearable device 101 according to an embodiment may include at least one of a processor 210, memory 215, a display 220, a camera 225, a sensor 230, or a communication circuit 235. The processor 210, the memory 215, the display 220, the camera 225 (e.g., a camera 860 of FIGS. 8A to 9B), the sensor 230, and/or the communication circuit 235 may be electronically and/or operably coupled with each other by an electronical component such as a communication bus 202. The type and/or number of hardware components included in the wearable device 101 is not limited as illustrated in FIG. 2. For example, the wearable device 101 may include only some of the hardware components illustrated in FIG. 2.

The processor 210 of the wearable device 101 according to an embodiment may include a hardware component for processing data based on one or more instructions. The hardware component for processing data may include, for example, an arithmetic and logic unit (ALU), a field programmable gate array (FPGA), a central processing unit (CPU), and/or an application processor (AP). In an embodiment, the wearable device 101 may include one or more processors. The processor 210 may have a structure of a multi-core processor such as a dual core, a quad core, a hexa core, and/or an octa core.

The memory 215 of the wearable device 101 according to an embodiment may include a hardware component for storing data and/or instructions inputted and/or outputted to the processor 210. The memory 215 may include, for example, volatile memory such as random-access memory (RAM) and/or non-volatile memory such as read-only memory (ROM). The volatile memory may include, for example, at least one of dynamic RAM (DRAM), static RAM (SRAM), Cache RAM, and pseudo-SRAM (PSRAM). The non-volatile memory may include, for example, at least one of programmable ROM (PROM), erasable PROM (EPROM), electrically erasable PROM (EEPROM), flash memory, hard disk, compact disk, and embedded multimedia card (eMMC). In an embodiment, the memory 215 may be referred to as storage.

In an embodiment, the display 220 of the wearable device 101 may output visualized information (e.g., a screen 130 of FIGS. 1, 4, 5A to 5E and/or screens 701, 702, and 703 of FIG. 7) to a user (e.g., a user 110 of FIG. 1) of the wearable device 101. For example, the display 220 may output the visualized information to the user, by being controlled by the processor 210 including a circuit such as a graphic processing unit (GPU). The display 220 may include a flexible display, a flat panel display (FPD), and/or electronic paper. The display 220 may include a liquid crystal display (LCD), a plasma display panel (PDP), and/or one or more light emitting diodes (LEDs). The LED may include an organic LED (OLED). The embodiment is not limited thereto, and for example, in case that the wearable device 101 includes a lens for transmitting external light (or ambient light), the display 220 may include a projector (or projection assembly) for projecting light onto the lens. In an embodiment, the display 220 may be referred to as a display panel and/or display module.

In an embodiment, the camera 225 of the wearable device 101 may include one or more optical sensors (e.g., a charged coupled device (CCD) sensor, a complementary metal oxide semiconductor (CMOS) sensor) that generate an electrical signal indicating a color and/or brightness of the light. The camera 225 may be referred to as an image sensor, and may be included in the sensor 230 of FIG. 2. A plurality of optical sensors included in the camera 225 may be arranged in the form of a 2 dimensional array. The camera 225 may generate 2 dimensional frame data corresponding to light reaching the optical sensors of the 2 dimensional array, by obtaining electrical signals of each of the plurality of optical sensors substantially simultaneously. For example, photo data captured using the camera 225 may mean a 2 dimensional frame data obtained from the camera 225. For example, video data captured using the camera 225 may mean a sequence of 2 dimensional frame data obtained from the camera 225 according to a frame rate. The camera 225 may be disposed toward a direction in which the camera 225 receives the light and may further include a flash light for outputting the light toward the direction.

According to an embodiment, the wearable device 101 is an example of the camera 225 and may include a plurality of cameras disposed toward different directions. Referring to FIG. 2, the camera 225 included in the wearable device 101 may include an eye tracking camera 225-1 and/or an outward camera 225-2. The eye tracking camera 225-1 may be disposed toward at least one of the two eyes of the user wearing the wearable device 101. The processor 210 may identify a direction of the user's gaze by using the image and/or video obtained from the eye tracking camera 225-1. The eye tracking camera 225-1 may include an infrared (IR) sensor. The eye tracking camera 225-1 may be referred to as an eye sensor, a gaze tracker, and/or an eye tracker.

Referring to FIG. 2, the outward camera 225-2 may be disposed toward a forward direction (e.g., a direction in which two eyes may be directed) relative to the user wearing the wearable device 101. The embodiment is not limited thereto, and the outward camera 225-2 may be disposed toward the external space. Using the image and/or video obtained from the outward camera 225-2, the processor 210 may identify an external object (e.g., a user terminal 120 of FIG. 1). The embodiment is not limited thereto, and the processor 210 may identify a location, shape, and/or gesture (e.g., hand gesture) of a hand based on the image and/or video obtained from the outward camera 225-2.

According to an embodiment, the sensor 230 of the wearable device 101 may generate electrical information that may be processed and/or stored by the processor 210 and/or the memory 215 of the wearable device 101 from non-electronic information associated with the wearable device 101. The information may be referred to as sensor data. The sensor 230 may include a global positioning system (GPS) sensor, an image sensor, an audio sensor (e.g., a microphone array including a microphone and/or a plurality of microphones), an illumination sensor, and/or a time-of-flight (ToF) sensor (or ToF camera) for detecting a geographic location of the wearable device 101.

In an embodiment, the sensor 230 may include an inertial measurement unit (IMU) for detecting a physical motion of the wearable device 101. An acceleration sensor, a geomagnetic sensor, a gravity sensor, or any combination thereof may be referred to as an IMU. The acceleration sensor may output an electrical signal indicating gravitational acceleration and/or acceleration of each of a plurality of axes (e.g., x-axis, y-axis, and z-axis), which are perpendicular to each other and based on the designated origin of the wearable device 101. The gyro sensor may output an electrical signal indicating angular velocities (e.g., roll, pitch, and/or yaw) of the plurality of axes. The gyro sensor may be referred to as an angular velocity sensor. The geomagnetic sensor may output an electrical signal indicating a size of a magnetic field formed in the wearable device 101 along each of the plurality of axes (e.g., x-axis, y-axis, and/or z-axis). For example, the acceleration sensor, the gyro sensor, and/or the geomagnetic sensor may repeatedly output sensor data including accelerations, angular velocities, and/or sizes of the magnetic field of the number of the plurality of axes based on a designated period (e.g., 1 millisecond).

In an embodiment, the communication circuit 235 of the wearable device 101 may include a circuit for supporting transmission and/or reception of an electrical signal between the wearable device 101 and an external electronic device. The communication circuit 235 may include at least one of, for example, a modem (MODEM), an antenna, and an optic/electronic (O/E) converter. The communication circuit 235 may support the transmission and/or reception of the electrical signal based on various types of protocols such as ethernet and local area network (LAN), wide area network (WAN), wireless fidelity (WiFi), Bluetooth, bluetooth low energy (BLE), ZigBee, long term evolution (LTE), 5G new radio (NR), 6G, and/or above-6G. In an embodiment, the communication circuit 235 may be referred to as a communication processor and/or a communication module.

According to an embodiment, in the memory 215 of the wearable device 101, data to be processed by the processor 210 of the wearable device 101 and one or more instructions (or instructions) indicating a calculation and/or an operation to be performed may be stored. The set of the one or more instructions may be referred to as a program, firmware, operating system, process, routine, sub-routine and/or software application (hereinafter referred to as an application). For example, the wearable device 101 and/or the processor 210 may perform at least one of the operations of FIGS. 3A to 3C and/or 6 when a set of a plurality of instructions distributed in the form of an operating system, firmware, driver, program, and/or application are executed. Hereinafter, the fact that the application is installed in the wearable device 101 may mean that one or more instructions provided in the form of an application are stored in the memory 215, and the one or more applications are stored in an executable format (e.g., a file having an extension designated by the operating system of the wearable device 101) by the processor 210. For example, the application may include a program and/or a library associated with a service provided to the user.

Referring to FIG. 2, programs installed in the wearable device 101 may be classified into any one layer among different layers including an application layer 240, a framework layer 250, and/or a hardware abstraction layer (HAL) 280 based on a target. For example, programs (e.g., a module, or a driver) designed to target the hardware (e.g., the display 220, the camera 225, the sensor 230, and/or the communication circuit 235) of the wearable device 101 may be classified in the hardware abstraction layer (HAL) 280. The framework layer 250 may be referred to as an XR framework layer, in terms of including one or more programs for providing an extended reality (XR) service. For example, the layers illustrated in FIG. 2 are logically (or for convenience of explanation) divided and may not mean that an address space of the memory 215 is divided by the layers.

For example, programs (e.g., a location tracker 271, a space recognizer 272, a gesture tracker 273, a gaze tracker 274, and/or a face tracker 275) designed to target at least one of the hardware abstraction layer (HAL) 280 and/or the application layer 240 may be classified in the framework layer 250. The programs classified as the framework layer 250 may provide an application programming interface (API) that may be executed (or invoked or called) based on another program.

For example, in the application layer 240, a program designed to target the user of the wearable device 101 may be classified. As an example of programs classified as the application layer 240, an extended reality (XR) system user interface (UI) 241 and/or an XR application 242 are exemplified, but the embodiment is not limited thereto. For example, the programs (e.g., a software application) classified as the application layer 240 may cause execution of functions supported by the programs classified as the framework layer 250, by calling the application programming interface (API).

For example, the wearable device 101 may display one or more visual objects for performing interaction with the user on the display 220 based on execution of the XR system UI 241. The visual object may mean an object that is deployable in the screen for transmission and/or interaction of information, such as text, an image, an video, a button, a check box, a radio button, a text box, a slider and/or a table. The visual object may be referred to as a visual guide, a virtual object, a visual element, a UI element, a view object, and/or a view element. The wearable device 101 may provide the user with functions available in the virtual space based on execution of the XR system UI 241.

Referring to FIG. 2, a lightweight renderer 243 and/or an XR plug-in 244 are illustrated to be included in the XR system UI 241, but are not limited thereto. For example, based on the XR system UI 241, the processor 210 may execute the lightweight renderer 243 and/or the XR plug-in 244 in the framework layer 250.

For example, based on the execution of the lightweight renderer 243, the wearable device 101 may obtain a resource (e.g., API, system process, and/or library) used to define, create, and/or execute a rendering pipeline that is allowed partial change. The lightweight renderer 243 may be referred to as a lightweight render pipeline in terms of defining the rendering pipeline that is allowed partial change. The lightweight renderer 243 may include a renderer (e.g., a prebuilt renderer) built before execution of the software application. For example, the wearable device 101 may obtain the resource (e.g., API, system process, and/or library) used to define, create, and/or execute the entire rendering pipeline based on execution of the XR plug-in 244. The XR plug-in 244 may be referred to as an open XR native client in terms of defining (or setting) the entire rendering pipeline.

For example, the wearable device 101 may display a screen indicating at least a portion of the virtual space on the display 220 based on execution of the XR application 242. A XR plug-in 244-1 included in the XR application 242 may include instructions that support a function similar to that of the XR plug-in 244 of the XR system UI 241. Among a description of the XR plug-in 244-1, a description that overlap with a description of the XR plug-in 244 may be omitted. The wearable device 101 may cause execution of a virtual space manager 251 based on the execution of the XR application 242.

According to an embodiment, the wearable device 101 may provide a virtual space service based on the execution of the virtual space manager 251. For example, the virtual space manager 251 may include a platform for supporting the virtual space service. Based on the execution of the virtual space manager 251, the wearable device 101 may identify a virtual space formed based on the user's location indicated by the data obtained through the sensor 230 and/or images captured by the outward camera 225-2, and may display at least a portion of the virtual space on the display 220. The virtual space manager 251 may be referred to as a composition presentation manager (CPM).

For example, the virtual space manager 251 may include a runtime service 252. For example, the runtime service 252 may be referred to as an OpenXR runtime module (or OpenXR runtime program). The wearable device 101 may execute at least one of a user's pose prediction function, a frame timing function, and/or a space input function based on the execution of the runtime service 252. For example, the wearable device 101 may perform rendering for the virtual space service to the user based on the execution of the runtime service 252. For example, based on the execution of the runtime service 252, a function associated with the virtual space that may be executed by the application layer 240 may be supported.

For example, the virtual space manager 251 may include a pass-through manager 253. Based on execution of the pass-through manager 253, the wearable device 101 may display another screen (e.g., a portion 150 of FIG. 1) indicating an actual space obtained through the outward camera 225-2 by overlapping on at least a portion of the screen, while displaying a screen (e.g., the screen 130 of FIG. 1) indicating the virtual space on the display 220.

For example, the virtual space manager 251 may include an input manager 254. The wearable device 101 may identify data (e.g., sensor data) obtained by executing one or more programs included in a perception service layer 270 based on execution of the input manager 254. The wearable device 101 may identify a user input associated with the wearable device 101 by using the obtained data. The user input may be associated with the user's motion (e.g., hand gesture), gaze, and/or utterance identified by the sensor 230.

For example, a perception abstract layer 260 may be used for data exchange between the virtual space manager 251 and the perception service layer 270. In terms of being used for the data exchange between the virtual space manager 251 and the perception service layer 270, the perception abstract layer 260 may be referred to as an interface. For example, the perception abstract layer 260 may be referred to as OpenPX. The perception abstract layer 260 may be used for a perception client and a perception service.

According to an embodiment, the perception service layer 270 may include one or more programs for processing data obtained from the sensor 230 and/or the camera 225. The one or more programs may include at least one of the location tracker 271, the space recognizer 272, the gesture tracker 273, the gaze tracker 274, and/or the face tracker 275. The type and/or number of one or more programs included in the perception service layer 270 is not limited as illustrated in FIG. 2.

For example, the wearable device 101 may identify a pose (i.e., position and orientation) of the wearable device 101 by using the sensor 230 based on execution of the location tracker 271. Based on the execution of the location tracker 271, the wearable device 101 may identify the 6 degrees of freedom pose (6 dof pose) of the wearable device 101 by using data obtained using the outward camera 225-2 and/or the IMU (e.g., the gyro sensor, the acceleration sensor, and/or the geomagnetic sensor). The location tracker 271 may be referred to as a head tracking (HeT) module (or a head tracker, a head tracking program).

For example, the wearable device 101 may obtain information for providing a three-dimensional virtual space corresponding to a surrounding environment (e.g., the external space) of the wearable device 101 (or the user of the wearable device 101) based on execution of the space recognizer 272. The wearable device 101 may reconstruct the surrounding environment of the wearable device 101 in three dimensions by using the data obtained using the outward camera 225-2 based on the execution of the space recognizer 272. The wearable device 101 may identify at least one of a plane, an inclination, and a staircase based on the surrounding environment of the wearable device 101 reconstructed in three dimensions based on the execution of the space recognizer 272. The space recognizer 272 may be referred to as a scene understanding (SU) module (or scene understanding (SU) program).

For example, the wearable device 101 may identify (or recognize) a pose and/or gesture of the user's hand of the wearable device 101 based on execution of the gesture tracker 273. For example, the wearable device 101 may identify the pose and/or gesture of the user's hand by using data obtained from the outward camera 225-2 based on the execution of the gesture tracker 273. For example, the wearable device 101 may identify the pose and/or gesture of the user's hand based on the data (or an image) obtained using the outward camera 225-2 based on the execution of the gesture tracker 273. The gesture tracker 273 may be referred to as a hand tracking (HaT) module (or hand tracking program), and/or a gesture tracking module.

For example, the wearable device 101 may identify (or track) movement of the user's eyes of the wearable device 101 based on execution of the gaze tracker 274. For example, the wearable device 101 may identify the movement of the user's eyes by using data obtained from the eye tracking camera 225-1 based on the execution of the gaze tracker 274. The gaze tracker 274 may be referred to as an eye tracking (ET) module (or an eye tracking program), and/or a gaze tracking module.

For example, the perception service layer 270 of the wearable device 101 may further include the face tracker 275 for tracking the user's face. For example, the wearable device 101 may identify (or track) the movement of the user's face and/or the user's facial expression based on execution of the face tracker 275. The wearable device 101 may estimate the user's facial expression based on the movement of the user's face based on the execution of the face tracker 275. For example, the wearable device 101 may identify the movement of the user's face and/or the user's facial expression based on data (e.g., an image) obtained using the sensor 230 (e.g., an image sensor facing at least a portion of the user's face) based on the execution of the face tracker 275.

According to an embodiment, the processor 210 of the wearable device 101 may perform scene understanding (SU) associated with the camera 225 and/or the outward camera 225-2 based on the execution of the space recognizer 272. The wearable device 101 may store object information 290 on an external object recognized based on the scene understanding (SU) in the memory 215. The object information 290 may include metadata indicating a location (e.g., a relative location with respect to the wearable device 101) of an external object that has potential to generate sound and/or the type of sound generated from the external object.

According to an embodiment, the processor 210 of the wearable device 101 may recognize a sound source (e.g., an external object) that outputs sound from an audio signal obtained by the sensor 230 (e.g., one or more microphones). The recognition of the sound source may be performed based on a neural network. The neural network may include a mathematical model for neural activity of a human and/or animal, hardware (e.g., the processor 210 such as CPU, GPU, and/or neural processing unit (NPU), software, or any combination thereof for driving the mathematical model. The neural network may include a feedforward neural network (FNN), a recurrent neural network (RNN), a convolutional neural network (CNN), a long-short term memory (LSTM), and/or the like, including combinations and/or multiples thereof. In case that the sound source checked by the processor 210 matches an external object included in the object information 290, the processor 210 may display a pass-through region (e.g., the portion 150 of FIG. 1) on the display 220 based on the execution of the pass-through manager 253.

As described above, according to an embodiment, the wearable device 101 may more accurately determine or calculate whether to display a portion of the external space in which the sound is generated and/or a size of the pass-through region to be displayed on the display 220 to the user (e.g., the user 110 of FIG. 1) wearing the wearable device 101 based on the scene understanding (SU) and audio signal processing.

Hereinafter, an example of operations performed by the wearable device 101 of FIGS. 1 and 2 and/or the processor 210 of FIG. 2 will be described with reference to FIGS. 3A, 3B and/or 3C.

Figure 3A:
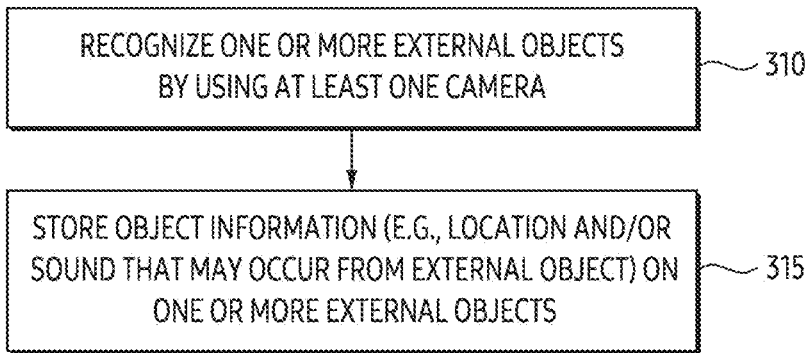
FIGS. 3A, 3B, and 3C illustrate an example of a flowchart of a wearable device according to an embodiment.
Figure 3B:
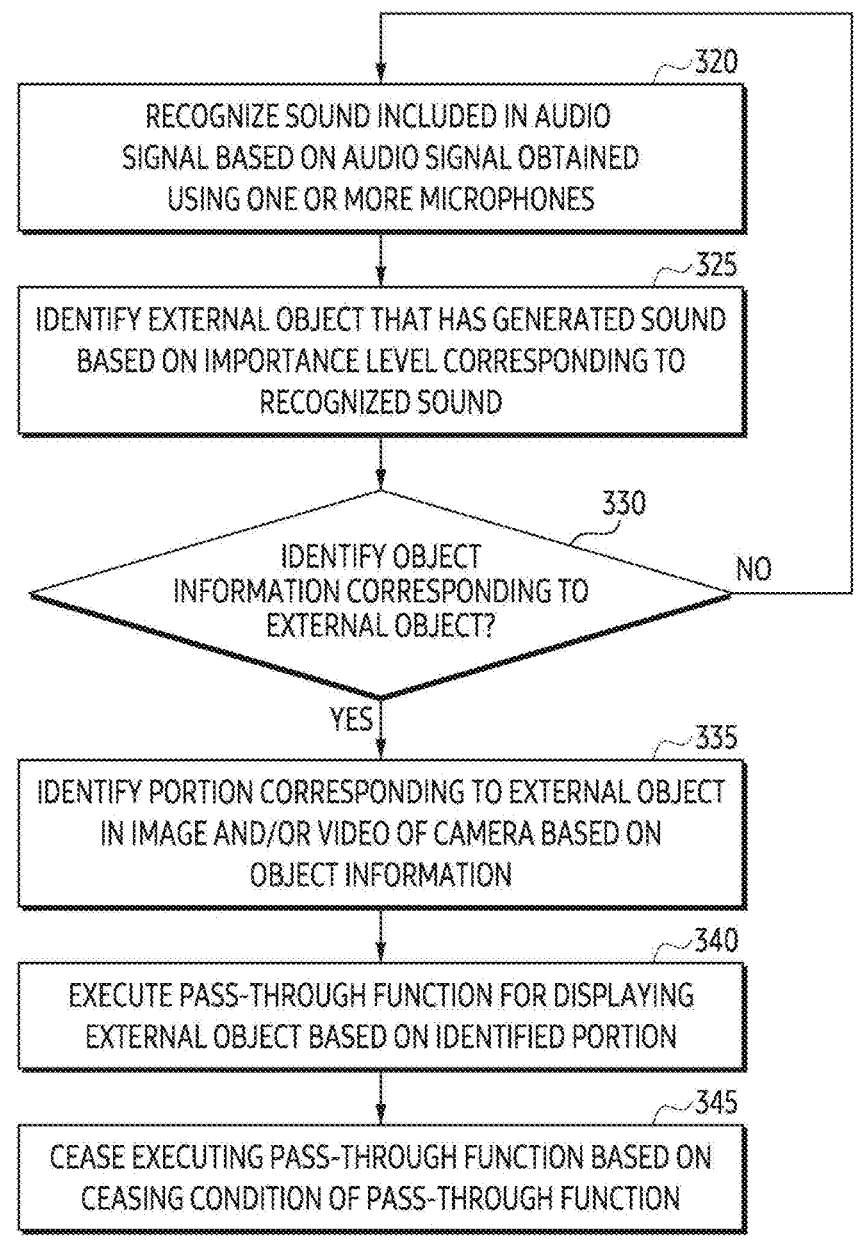
Figure 3C:
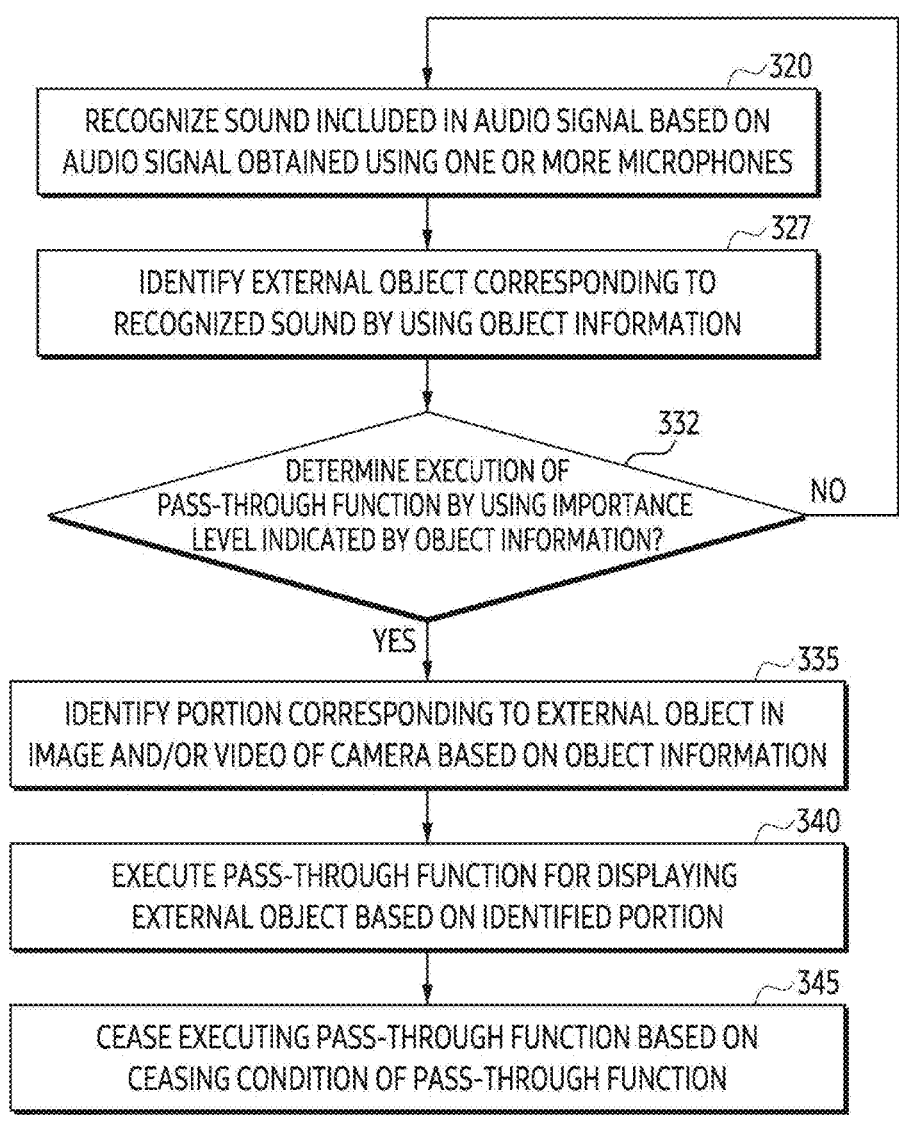

FIGS. 3A, 3B, and 3C illustrate an example of a flowchart of a wearable device according to an embodiment. A wearable device 101 of FIGS. 1 and 2 and/or a processor 210 of FIG. 2 may perform operations described with reference to FIGS. 3A, 3B and/or 3C.

Referring to FIG. 3A, in operation 310, a processor of the wearable device, according to an embodiment, may recognize one or more external objects by using at least one camera (e.g., a camera 225 of FIG. 2 and/or an outward camera 225-2). For example, the processor may perform the operation 310 based on one or more feature points (or key points) extracted from an image and/or video obtained from at least one camera. The processor may recognize a location and/or type (or class and/or category) of the external object captured by at least one camera, based on the image and/or video. For example, the processor may determine a type matching the external object among the designated types.

Referring to FIG. 3A, in operation 315, according to an embodiment, the processor of the wearable device may store object information (e.g., location and/or sound that may occur from the external object) on one or more external objects. The object information in the operation 315 may include object information 290 of FIG. 2. The processor may store object information on one or more external objects recognized based on scene understanding (SU) in memory (e.g., memory 215 of FIG. 2). The object information stored in the memory may include data for distinguishing locations of one or more external objects for the wearable device, types of one or more external objects, and/or sounds that may occur in the one or more external objects.

An operation of the processor associated with the scene understanding (SU) described with reference to FIG. 3A may be repeatedly (or periodically) performed based on execution of a space recognizer 272 of FIG. 2. For example, after the wearable device is turned on, the processor may create or execute a background process for performing the operations of FIG. 3A based on multitasking (or multi-threading). Information (e.g., the object information of the operation 315) stored in the memory based on FIG. 3A may be used to display a pass-through region based on analysis of an audio signal. The information stored based on FIG. 3A is visually recognized information based on a camera and may include information on a visually recognized external object. The information stored based on FIG. 3A may include information on sound that may be generated from the external object, inferred based on visually recognizing the external object. Referring to FIG. 3B, an operation of a processor associated with analysis of the audio signal is illustrated. An operation (e.g., operations 320 and 325) of the wearable device described with reference to FIG. 3B may be performed based on an audio signal obtained through a microphone among the microphone or a camera.

Referring to FIG. 3B, in operation 320, the processor of the wearable device according to an embodiment may recognize sound included in the audio signal based on the audio signal obtained using one or more microphones. The one or more microphones of the operation 320 may be included in a sensor (e.g., a sensor 230 of FIG. 2) of the wearable device. The processor may recognize the sound included in the audio signal by using a neural network into which the audio signal is input. Recognizing the sound by the processor may include an operation of estimating the external object that has generated the sound. For example, based on the recognition of the sound, the processor may recognize sound generated from an external object that is not included by the object information of FIG. 3A. The processor that recognizes the sound generated from the external object not included in the object information may update the object information based on a result of recognizing the sound. For example, the processor may obtain, from the audio signal, information indicating the type, class, and/or category of the external object. The information may be obtained from the neural network into which the audio signal is inputted.

Referring to FIG. 3B, in operation 325, according to an embodiment, the processor of the wearable device may identify an external object that has generated sound based on importance level corresponding to the recognized sound. The importance level of the operation 325 may be associated with the type of external object that generated the sound. The importance level of the operation 325 may be preset information individually set to each of the types of the external object. In the preset information, types of sound (e.g., doorbell, cell phone ringtone, knocking sound, baby crying sound, and/or the like, including combinations and/or multiples thereof) and numeric values indicating importance level may be matched. In the preset information, the exemplified types and icons for representing sound may be matched. The embodiment is not limited thereto, and the importance level of the operation 325 may be adjusted according to interaction between the external object and the user wearing the wearable device. The importance level of the operation 325 may be adjusted based on a user input identified through a software application for changing the preset information, such as the setting application. The importance level of the operation 325 may be associated with whether to display a pass-through region corresponding to the external object, and a location, size, and/or transparency of the pass-through region.

Referring to FIG. 3B, in operation 330, the processor of the wearable device according to an embodiment may determine whether to identify object information corresponding to the external object. The processor may include the object information 290 (e.g., the object information of the operation 315 of FIG. 3A) of FIG. 2. In the object information, in case that data corresponding to the external object identified based on the operation 325 is not identified (330—No), the processor may refrain from, cease, or limit displaying a screen (e.g., the pass-through region) associated with the external object in the display region. In case that the object information corresponding to the external object is not identified (330—No), the processor may maintain recognition of the sound included in the audio signal based on the operation 320. In case that the object information corresponding to the external object is identified (330—Yes), the processor may perform operation 335.

Referring to FIG. 3B, in the operation 335, according to an embodiment, the processor of the wearable device may identify a portion corresponding to the external object in the image and/or video of the camera based on the object information. The processor may segment or may crop a portion (e.g., a portion 150 of FIG. 1) associated with the external object from the image and/or video of the camera, based on a location of the external object indicated by the object information based on the scene understanding (SU).

Referring to FIG. 3B, in operation 340, according to an embodiment, the processor of the wearable device may execute a pass-through function for displaying the external object based on the identified portion. For example, the processor may display a portion of the operation 340 on a display (e.g., a display 220 of FIG. 2). A location of the portion displayed on the display based on execution of the pass-through function may be associated with a relative location of the external object with respect to the wearable device. The relative location of the external object with respect to the wearable device may be included in the object information. A size of the portion displayed on the display based on the execution of the pass-through function may be associated with at least one of a distance between the external object and the wearable device indicated by the object information, the importance level of the operation 325, and/or an importance level corresponding to the external object in the object information.

In an embodiment, executing the pass-through function of the operation 340 by the wearable device 101 may be adjusted by a setting value associated with the pass-through function. For example, in a designated mode in which the pass-through function is disabled, such as an interference prohibition mode, the wearable device 101 may refrain from executing the pass-through function of the operation 340. The interference prohibition mode may be automatically abled in a time interval inputted by the user.

Referring to FIG. 3B, in operation 345, according to an embodiment, the processor of the wearable device may cease executing the pass-through function based on a ceasing condition of the pass-through function. The ceasing condition of the pass-through function may be associated with the user's motion while displaying a visual object (e.g., a portion of the operation 335) displayed based on the pass-through function executed based on the operation 340. For example, in case that a direction of the user's gaze is spaced apart from the visual object or a designated input for ceasing the display of the visual object is identified, the processor may cease executing the pass-through function based on the operation 345.

Referring to FIG. 3C, an operation of a processor associated with analysis of the audio signal is illustrated. An operation of the processor and/or the wearable device described with reference to FIG. 3C may be performed similarly to the operation of the processor and/or the wearable device described with reference to FIG. 3B.

Referring to FIG. 3C, in the operation 320, the processor of the wearable device according to an embodiment may recognize the sound included in the audio signal based on the audio signal obtained using one or more microphones. The operation 320 of FIG. 3C may correspond to the operation 320 of FIG. 3B. For example, the processor may recognize the sound included in the audio signal, by using the waveform, amplitude, and/or size of the frequency component of the audio signal. The processor that recognized the sound included in the audio signal may perform operation 327. The operation of recognizing the sound of the operation 320 may include an operation of calculating and/or obtaining not only whether the sound has been generated, but also a direction and/or distance in which the sound has been generated. The operation of recognizing the sound of the operation 320 may include an operation of inferring and/or determining a type of an external object that generated the sound, by using the sound.

Referring to FIG. 3C, in the operation 327, according to an embodiment, the processor of the wearable device may identify an external object corresponding to the recognized sound by using the object information. The object information of the operation 327 is the object information 290 of FIG. 2, and may be stored in the memory of the wearable device based on the operation described with reference to FIG. 3A. The processor may identify, in the object information of the operation 327, an external object set as a source of sound recognized based on the operation 320. For example, by comparing a type of the external object and/or sound generated from the external object included in the object information with a type of sound recognized based on a movement 320, the processor may identify the external object corresponding to the sound.

Referring to FIG. 3C, in operation 332, according to an embodiment, the processor of the wearable device may determine whether to execute the pass-through function by using the importance level indicated by the object information. The processor may obtain the importance level corresponding to the external object recognized based on the operation 327 from the object information. In case that the importance corresponding to the external object identified based on the operation 327 has a value indicating the execution of the pass-through function, the processor may determine the execution of the pass-through function. In case that it is determined to execute the pass-through function (332—Yes), the processor may perform the operation 335. In case that it is not determined to execute the pass-through function (332—No), the processor may perform the operation 320 without executing the pass-through function.

Referring to FIG. 3C, in the operation 335, according to an embodiment, the processor of the wearable device may identify the portion corresponding to the external object in the image and/or video of the camera based on the object information. In the operation 340, the processor may execute the pass-through function for displaying the external object, by using the portion identified based on the operation 335. In the operation 345, the processor may cease executing the pass-through function based on the ceasing condition of the pass-through function. The operations 335, 340, and 345 of FIG. 3C may be performed similarly to the operations 335, 340, and 345 of FIG. 3B.

Hereinafter, an exemplary operation of the wearable device that performs the scene understanding (SU) described with reference to FIG. 3A will be described with reference to FIG. 4.

Figure 4:
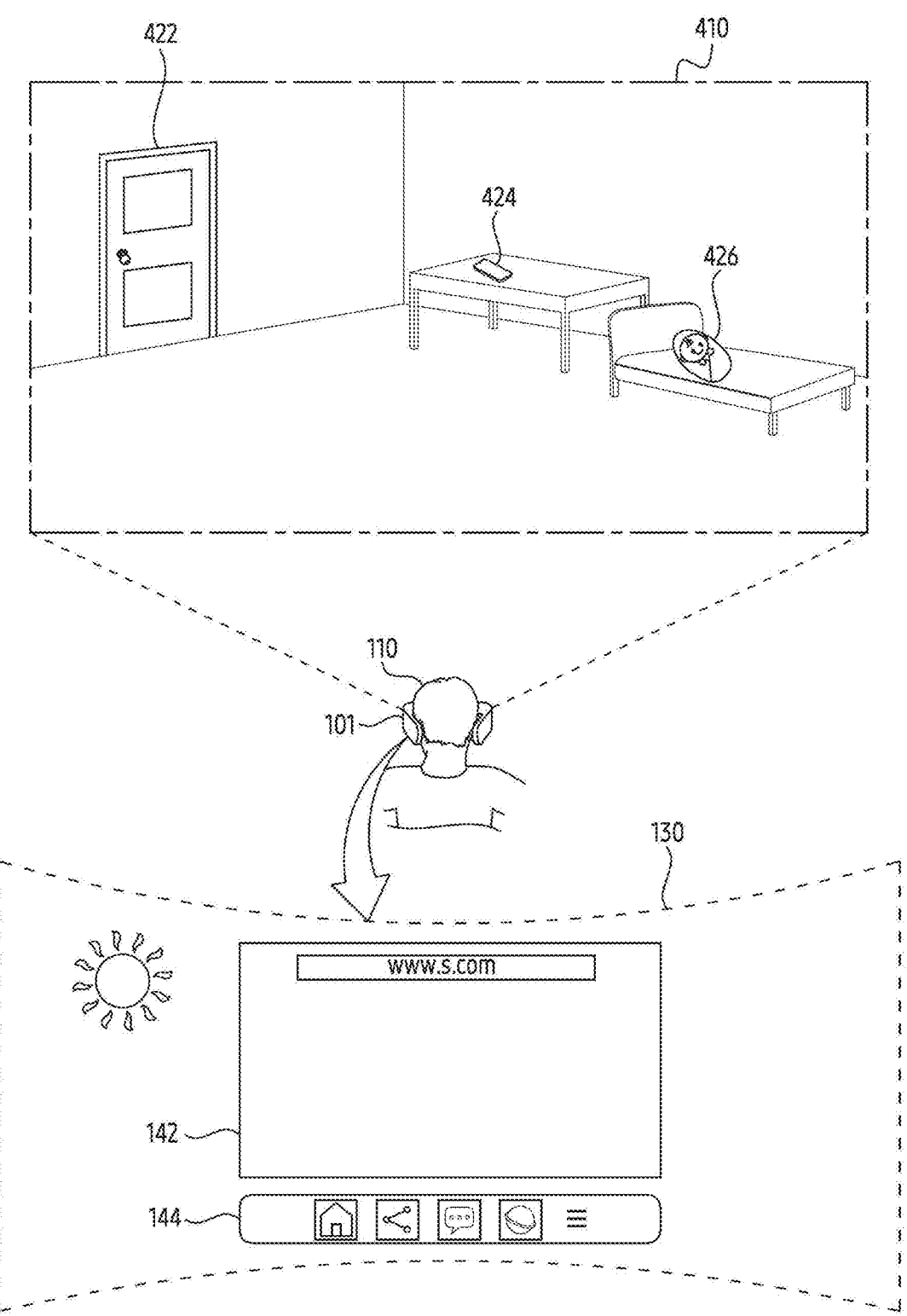
FIG. 4 illustrates an example of an operation of a wearable device that recognizes an external object included in an external space.

FIG. 4 illustrates an example of an operation of a wearable device 101 that recognizes an external object included in an external space. The wearable device 101 of FIGS. 1 and 2 and/or a processor 210 of FIG. 2 may perform an operation of the wearable device 101 described with reference to FIG. 4. The operation of the wearable device 101 described with reference to FIG. 4 may be associated with at least one of the operations of FIGS. 3A, 3B, and/or 3C.

According to an embodiment, the wearable device 101 may obtain an image and/or video of an external space by using a camera (e.g., a camera 225 and/or an outward camera 225-2 of FIG. 2). Referring to FIG. 4, an example of an image frame 410 included in the video is illustrated. In case of providing a VST-based user experience, the wearable device 101 may display a video including the image frame 410 on a display (e.g., a display 220 of FIG. 2).

In case of providing a VR-based user experience, the wearable device 101 may refrain from displaying the video including the image frame 410 on the display, and may display the screen 130 associated with the VR. For example, the wearable device 101 may display the screen 130 based on the VR on an entire displaying region of the display. While displaying the screen 130, a user 110 wearing the wearable device 101 may not view any image and/or video associated with the external space.

According to an embodiment, the wearable device 101 may recognize or identify one or more external objects 422, 424, and 426 in the image frame 410 based on scene understanding (SU). While displaying the VR-based screen 130, the wearable device 101 may perform the scene understanding (SU) on the image frame 410 obtained in real time through the camera. For example, the wearable device 101 may display the VR-based screen 130 on the entire displaying region of the display in a state of obtaining information on the external objects 422, 424, and 426 by using the camera based on the scene understanding (SU). The wearable device 101 may identify portions of the image frame 410 corresponding to the external objects 422, 424, and 426 based on the scene understanding (SU). The portions may have a polygonal shape including a square, such as a bounding box. The embodiment is not limited thereto, and the wearable device 101 may obtain pixel-wise information indicating which external object each of pixels of the image frame 410 corresponds to, based on the scene understanding (SU).

As described above with reference to FIGS. 2 and/or 3A, the information on the external objects 422, 424, and 426 identified through the image frame 410 may be stored in memory (e.g., memory 215 of FIG. 2) of the wearable device 101. The information may be referred to as object information (e.g., object information 290 of FIG. 2). The wearable device 101 that identified sound generated from at least one of the external objects 422, 424, and 426 may determine a location and/or size of a pass-through region to be displayed together with the screen 130 based on the object information. Hereinafter, an exemplary operation of the wearable device 101 that recognized sound generated from the external objects 422, 424, and 426 will be described with reference to FIGS. 5A to 5E.

FIGS. 5A to 5E illustrate examples of a UI displayed by a wearable device 101 that recognized sound. The wearable device 101 of FIGS. 1 and 2 and/or a processor 210 of FIG. 2 may perform an operation described with reference to FIGS. 5A, 5B, 5C, 5D, and 5E. An operation of the wearable device 101 described with reference to FIGS. 5A to 5E may be associated with the operations of FIGS. 3A to 3C.

Referring to FIGS. 5A to 5E, different states 501, 502, 503, 504, and 505 of the wearable device 101 included in an external space of FIG. 4 are illustrated. The states 501, 502, 503, 504, and 505 may be a state after a state illustrated with reference to FIG. 4. For example, while displaying a screen 130 based on the virtual space, the wearable device 101 may obtain an audio signal by using a sensor (e.g., a sensor 230 of FIG. 2) such as a microphone. Based on sound detected using the audio signal, the wearable device 101 may check whether an external object matching the sound is recognized using scene understanding (SU). In case that information based on the scene understanding (SU) includes data corresponding to the external object, the wearable device 101 may execute a pass-through function.

Figure 5A:
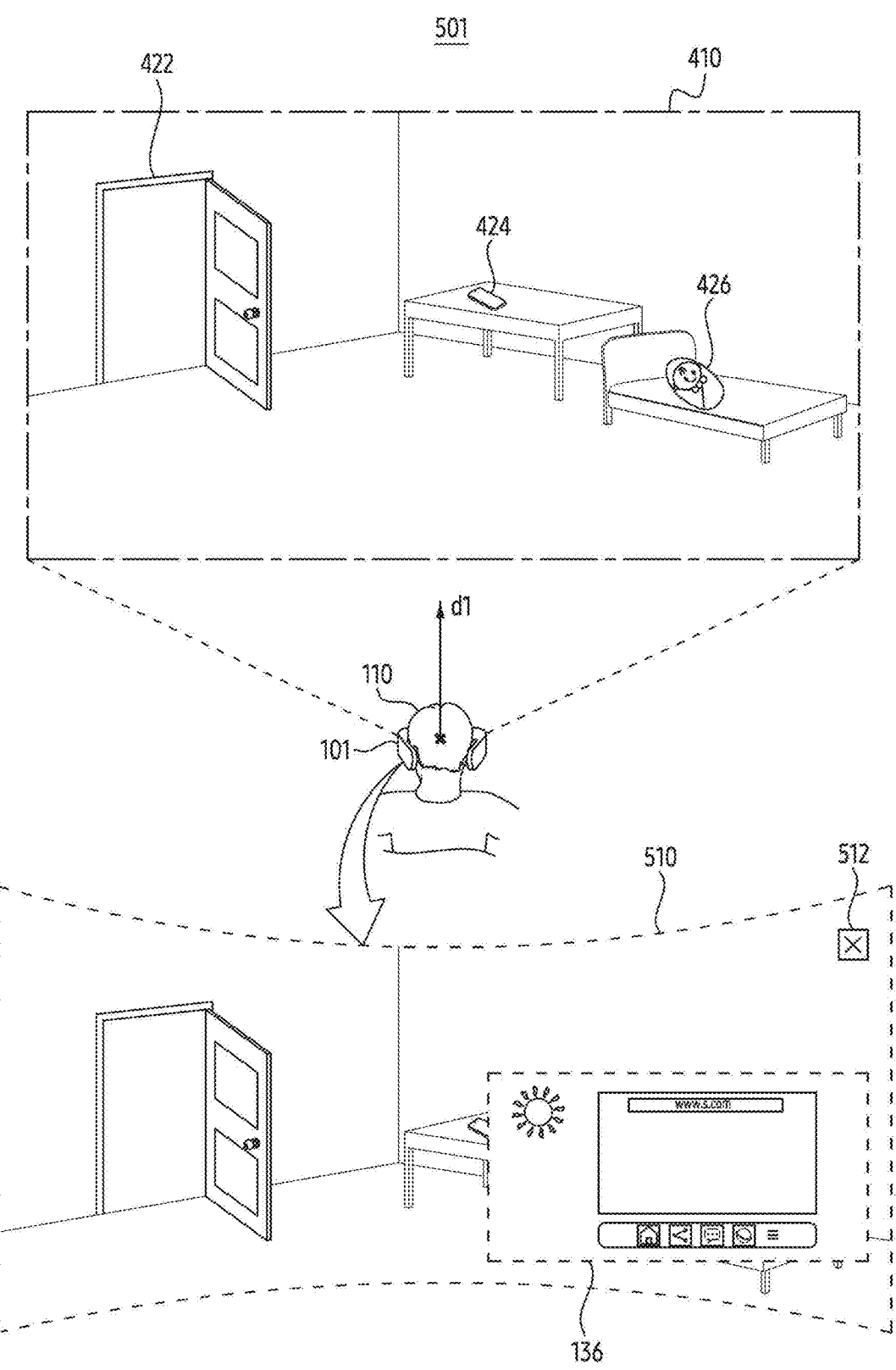
FIGS. 5A, 5B, 5C, 5D, and 5E illustrate examples of a UI displayed by a wearable device that recognized sound.

Referring to FIG. 5A, the state 501 in which sound is generated from an external object 422 corresponding to a door is illustrated. The wearable device 101 may detect sound generated from the external object 422 from the audio signal. The wearable device 101 may check or identify the type (e.g., the door) of the sound source from the audio signal. In the state 501, the wearable device 101 that detects the sound generated by the external object 422 may search for the external object 422 that matches the type checked from the audio signal in object information (e.g., object information 290 of FIG. 2) stored in the memory. In case that the object information includes data (e.g., importance) for the external object 422, the wearable device 101 may execute the pass-through function.

According to an embodiment, the wearable device 101 may determine at least a portion to be segmented based on the pass-through function in an image frame 410 of a camera (e.g., a camera 225 and/or an outward camera 225-1 of FIG. 2). The wearable device 101 may determine a portion of the image frame 410 associated with the external object 422 that outputs sound included in the audio signal as a portion to be displayed based on the pass-through function. In the exemplary state 501 identified the sound generated from the external object 422, a size of the portion that the wearable device 101 segments from the image frame 410 may be associated with an importance level of the external object 422 and/or the sound.

In an embodiment, the wearable device 101 may determine a size of the pass-through region by using information in which the sound and the importance level are matched. The information may be predetermined information. The embodiment is not limited thereto, and the wearable device 101 may adjust the importance level included in the information based on the motion of the user 110. In the exemplary state 501 of FIG. 5A, in case that sound of opening the door has first importance indicating that it is a relatively loud sound (e.g., above a threshold, measured in dB), the wearable device 101 may display a screen 510 including the image frame 410 based on a size of an entire displaying region of the display. In the exemplary state 501 of FIG. 5A, the wearable device 101 may reduce a VR-based screen 136 to a size less than the size of the entire displaying region. Referring to FIG. 5A, the VR-based screen 136 may be overlapped on an external space represented by the screen 510 on the display of the wearable device 101.

Figure 5B:
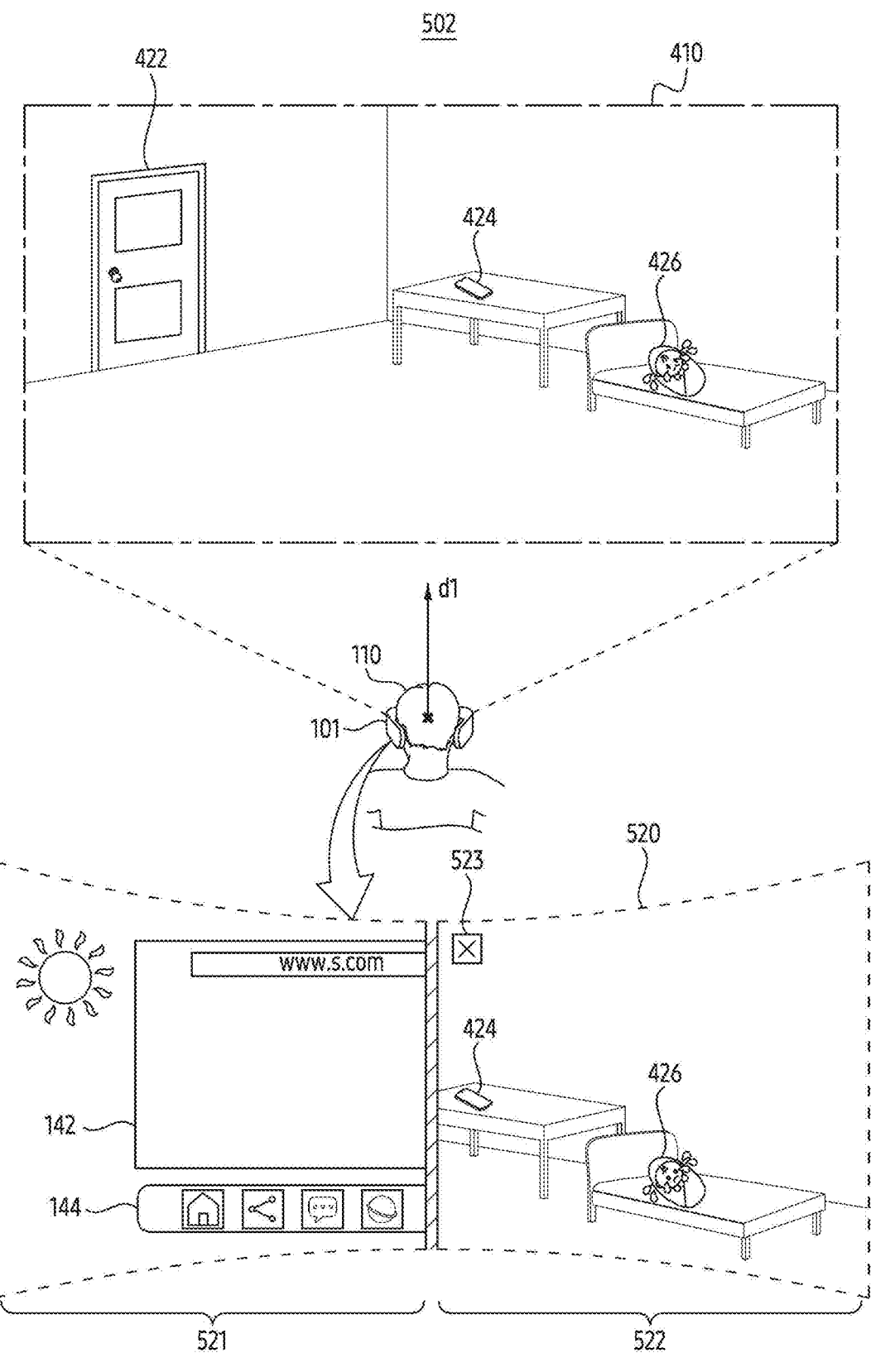

Referring to FIG. 5B, the state 502 in which the sound is generated from an external object 426 corresponding to a person (e.g., a baby) is illustrated. The wearable device 101 may detect sound generated from the external object 426 from the audio signal obtained using the microphone. The wearable device 101 may identify or recognize that the audio signal includes a baby's crying sound, by analyzing the audio signal. The wearable device 101 that recognized the baby's crying sound from the audio signal may identify the external object 426 classified as the baby in the object information. In case that no external object classified as the baby exists in the object information (e.g., in case that the baby is not identified based on the scene understanding (SU)), the wearable device 101 may not execute the pass-through function.

Referring to FIG. 5B, the wearable device 101 may execute the pass-through function in the state 502 in which the external object 426 corresponding to the baby is identified from the object information. For example, the wearable device 101 may execute the pass-through function based on an importance level corresponding to sound (e.g., the baby's crying sound) identified from the audio signal. The embodiment is not limited thereto, and the wearable device 101 may execute the pass-through function based on the importance level of the external object 426 set by the object information.

Referring to FIG. 5B, the wearable device 101 may display at least a portion of the image frame 410 having a size based on the importance level of the sound and/or the external object 426 in a portion 522 of the screen 520. In an embodiment having a second importance level lower than a first importance level that the baby's crying sound is assigned to the sound that opens the door of FIG. 5A, the wearable device 101 may set the portion 522 having a size smaller than the pass-through region of the state 501 of FIG. 5A as the pass-through region. Together with the portion 522 corresponding to the image frame 410, the wearable device 101 may display a screen associated with the VR in a portion 521 of the screen 520.

In the exemplary state 502 of FIG. 5B, a location of the portion 522 corresponding to the image frame 410 in the screen 520 may be checked by object information associated with the external object 426. The wearable device 101 may track or monitor a location and/or direction of the external object 426 with respect to the wearable device 101, by periodically (or repeatedly) performing the scene understanding (SU). The object information may be updated periodically (or repeatedly) based on the location and/or the direction of the external object 426 tracked by the wearable device 101. The wearable device 101 may determine a location in which the portion 522 of the image frame 410 is to be displayed in the screen 520 based on the location of the external object 426 with respect to the wearable device 101 indicated by the object information.

Figure 5C:
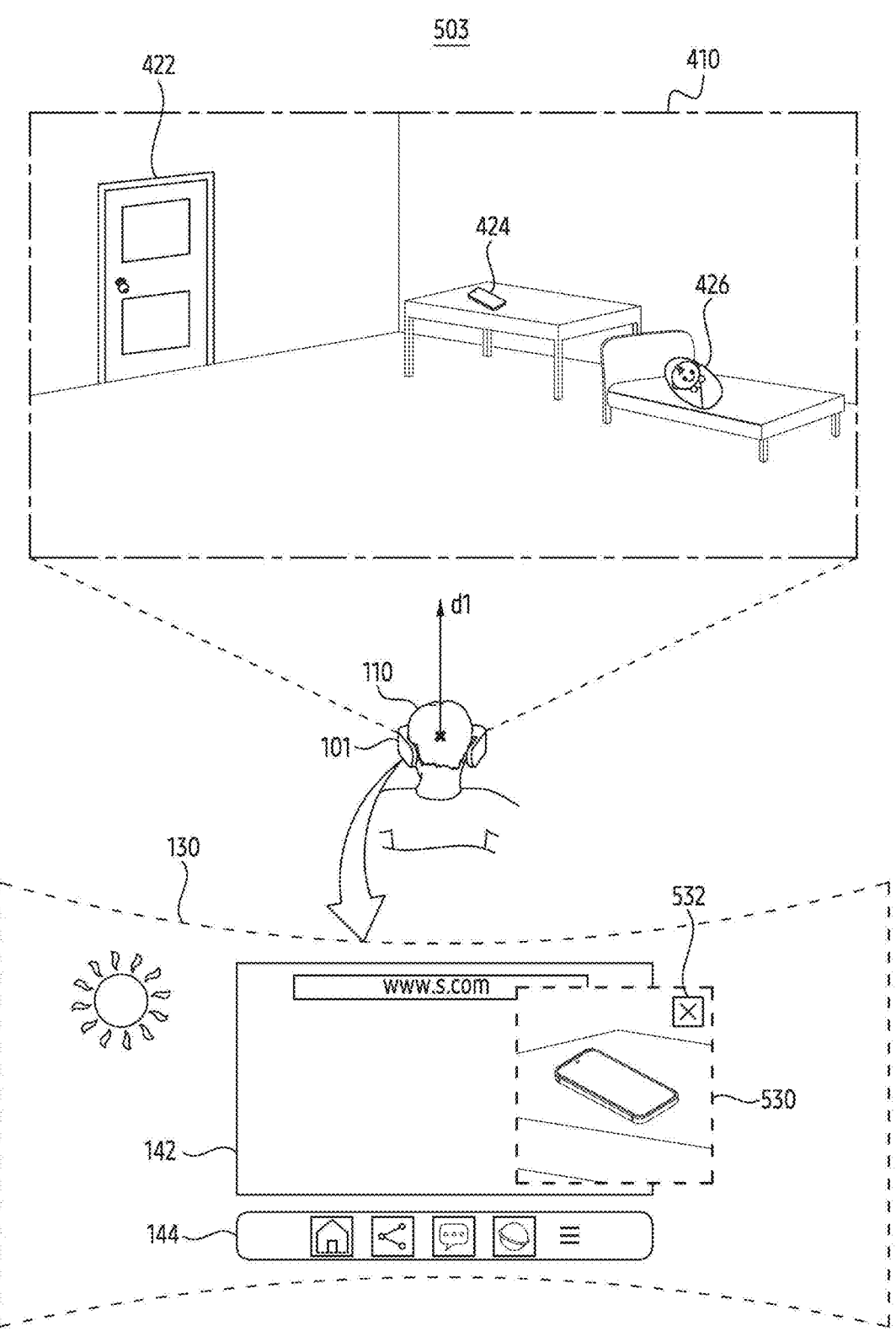

Referring to FIG. 5C, the state 503 in which the sound is generated from an external object 424 corresponding to a user terminal is illustrated. The wearable device 101 may detect sound generated from the external object 424 from an audio signal outputted from the microphone. For example, in response to identifying bell sound included in the audio signal, the wearable device 101 may search the external object 424 classified as a class (e.g., smartphone) corresponding to the bell sound in object information based on the scene understanding (SU). The wearable device 101 may execute the pass-through function based on the importance level and/or location of the external object 424 searched in the object information.

Referring to FIG. 5C, in the state 503 in which the data corresponding to the external object 424 is identified from the object information, the wearable device 101 may display a portion 530 of the image frame 410 together with the screen 130 based on the VR. The portion 530 displayed together with the screen 130 may be referred to as the pass-through region. The wearable device 101 may calculate a location and/or direction on the display in which the portion 530 is to be displayed based on the location and/or direction of the external object 424 indicated by the object information. In an embodiment in which the external object 424 has a third importance level lower than the second importance level of the external object 426 corresponding to the baby, the wearable device 101 may display the portion 530 having a size smaller than the portion 522 displayed based on the pass-through function based on the external object 426 in the screen 130.

According to the importance level, instead of displaying the pass-through region, the wearable device 101 may display a visual object for adjusting whether to display the pass-through region. In the exemplary state 504 of FIG. 5D, the wearable device 101 may display a visual object 540 for checking the execution of the pass-through function on the screen 130 based on the sound generated from the external object 424 having a relatively low importance level. The visual object 540 having the form of a pop-up window floating (or overlapping) on the screen 130 is exemplarily illustrated, but the embodiment is not limited thereto. A location on the screen 130 on which the visual object 540 is displayed may be associated with the location of the external object 424 indicated by the object information. The embodiment is not limited thereto, and the wearable device 101 may display the visual object 540 on a portion of the screen 130 spaced apart from the virtual objects 142 and 144 in the screen 130 to support interaction with the virtual objects 142 and 144.

The wearable device 101 may display, on the visual object 540, a button 541 for executing the pass-through function and a button 542 for limiting the execution of the pass-through function. Based on a user input to the button 542, the wearable device 101 may cease displaying the visual object 540 and may bypass executing the pass-through function. For example, the user input may be identified based on a gaze toward the button 542, a hand gesture associated with the button 542, and/or an utterance of the user 110 associated with the button 542. The embodiment is not limited thereto, and the user input may be identified by a remote controller connected (or paired) to the wearable device 101.

Figure 5D:
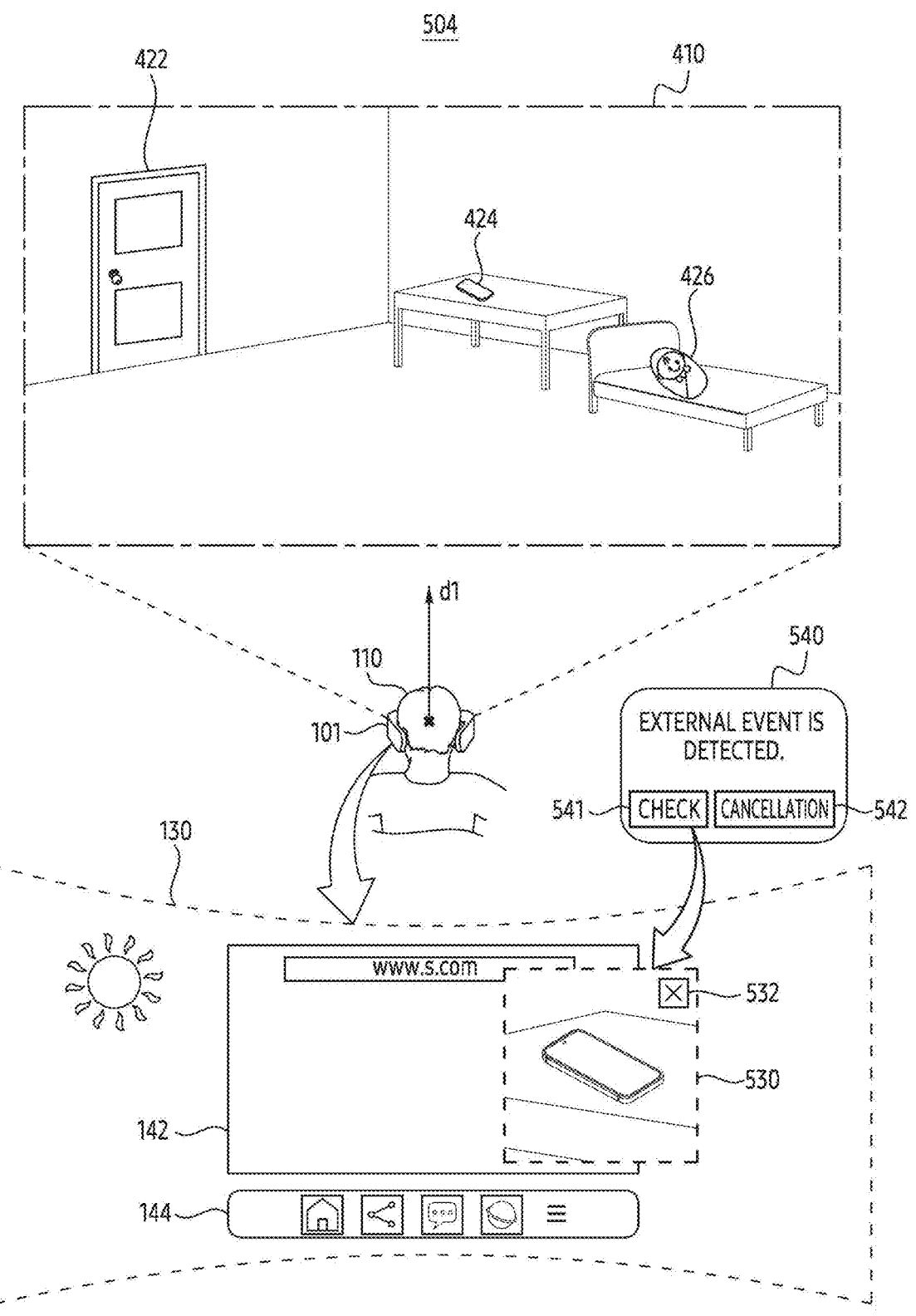

In the exemplary state 504 of FIG. 5D, in response to a user input indicating selection of the button 541, the wearable device 101 may display, together with the screen 130, the portion 530 based on the execution of the pass-through function. The portion 530 may be a portion associated with the external object 424 in the image frame 410 of the video obtained through the camera of the wearable device 101. The user input indicating the selection of the button 541 may be identified based on a gaze toward the button 541, a hand gesture associated with the button 541, and/or an utterance of the user 110 associated with the button 541. The user input may be identified by a remote controller connected (or paired) to the wearable device 101.

The UI outputted to check whether the wearable device 101 executes the pass-through function is not limited to the visual object 540 of FIG. 5D. For example, the wearable device 101 may notify the user 110 that the sound generated from the external object 424 has been recognized, based on a badge and/or icon displayed overlapping on the screen 130. A size, color, and/or transparency of the visual object 540, badge, and/or icon may be set by an importance level of the sound and/or the external object 424 corresponding to the sound.

Figure 5E:
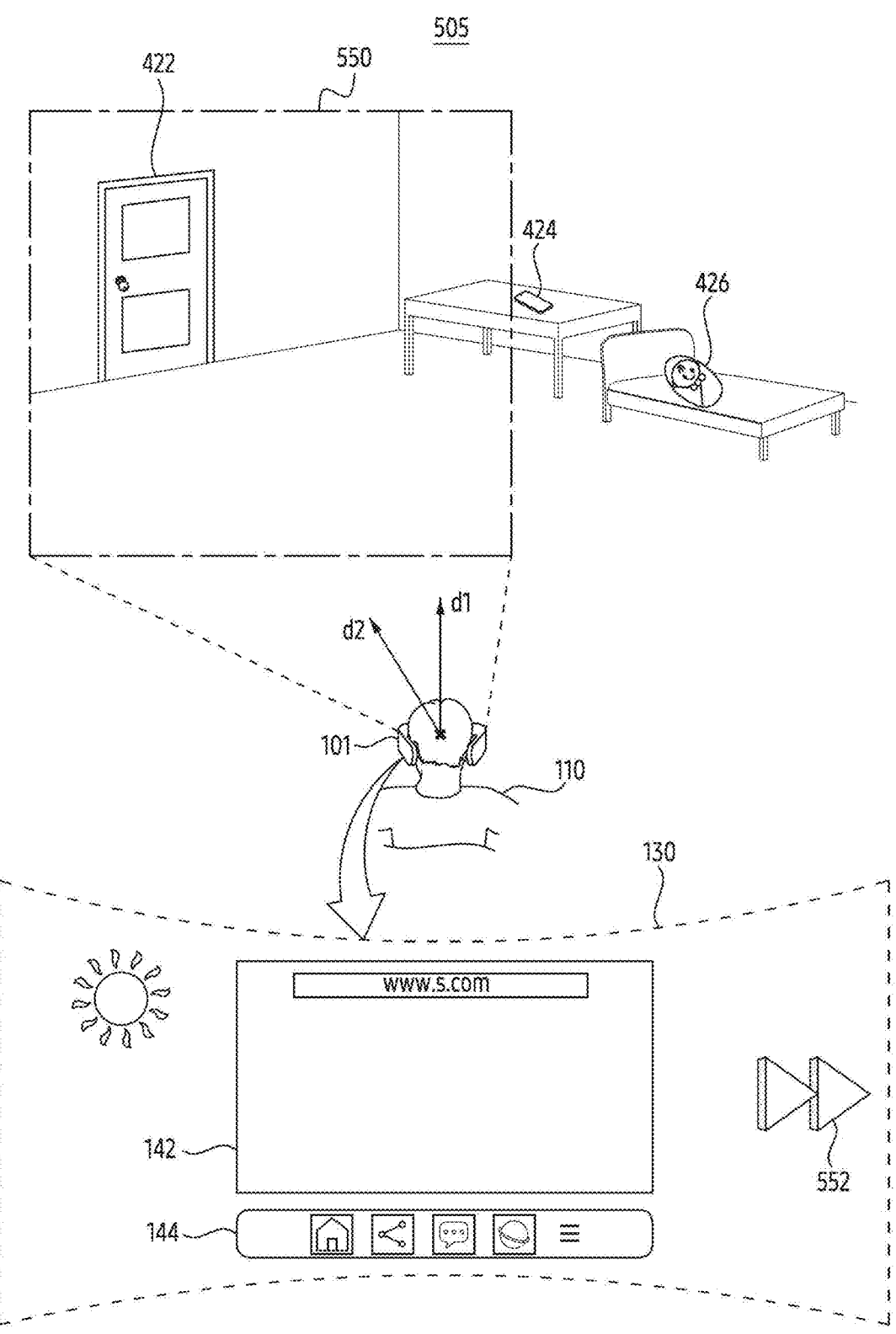

Since the display of the wearable device 101 and/or a viewing angle of the user 110 is limited, a location of an external object (e.g., external objects 422, 424, and 426) tracked by object information may be spaced apart from the field-of-view (FoV) shown on the display based on VST and/or AR. Referring to FIG. 5E, the exemplary state 505 in which the user 110 wearing the wearable device 101 looks in a direction d2 is illustrated. Unlike other states 501, 502, 503, and 504 looking in the direction d1, the external objects 424 and 426 may not be included in an image frame 550 obtained from the wearable device 101 in the state 505 in which the user 110 looks in a direction d2. The wearable device 101 may calculate or estimate the locations of the external objects 424 and 426 despite not being able to recognize the external objects 424 and 426 in the image frame 550 based on the object information and the direction d2 generated in the state before the state 505. For example, the wearable device 101 may estimate the current locations of the external objects 424 and 426 by combining the direction d2 of the wearable device 101 and a change amount of the location with the locations of the external objects 424 and 426 stored in the object information.

In the exemplary state 505 of FIG. 5E, the wearable device 101 that identified the sound generated from the external object 424 from the audio signal may display a virtual object 552 associated with the external object 424 in the screen 130 based on the location of the external object 424 estimated by the object information. For example, the wearable device 101 may display the virtual object 552 having the form of an arrow representing the location of the external object 424 with respect to the wearable device 101. The wearable device 101 may display the screen 130 including the virtual object 552 in the state 505 that identified the external object 424 having a location different from a portion of the external space corresponding to the image frame 550.

Referring to FIG. 5E, the virtual object 552 may have the form of an arrow facing a direction (e.g., a right direction of the user 110 in the state 505 of FIG. 5E) of the external object 424 in the screen 130. Using the virtual object 552 having the form of the arrow, the wearable device 101 may guide motion of the user 110 looking in the direction represented by the arrow. For example, the wearable device 101 may display the virtual object 552 for guiding the motion of the user 110 toward the external object 424. The embodiment is not limited thereto. For example, the wearable device 101 may display an icon indicating the type of sound recognized from the audio signal, together with the virtual object 552.

While the external object 424 generating the sound is located outside the FoV of the user 110 wearing the wearable device 101, the wearable device 101 may display the virtual object 552 representing the location of the external object 424. The wearable device 101 may monitor the direction d2 of the user 110 while displaying the virtual object 552. In case that the external object 424 enters the FoV of the user 110 based on the user 110 rotating the head, the wearable device 101 may display a portion of the image frame associated with the external object 424 based on the execution of the pass-through function, similar to the states 503 and 504 of FIGS. 5C and/or 5D.

As described above, according to an embodiment, the wearable device 101 may display another screen based on the execution of the pass-through function together with the screen 130 based on the VR. The wearable device 101 may display a pass-through region having a size based on the importance level of the external object together with the screen 130. The importance may be set to indicate the size of the pass-through region in object information obtained based on the scene understanding (SU).

Referring to FIGS. 5A to 5D, the size of the pass-through region displayed together with the screen 130 may vary according to a type of sound identified by the wearable device 101 and/or an importance level of the external object corresponding to the sound. A location where the pass-through region is displayed may be based on object information including a location of the external object tracked by the camera of the wearable device 101. For example, in case that it is not possible to search for an external object that generated the sound from the object information, the wearable device 101 may cease executing the pass-through function.

In an embodiment, displaying the pass-through region by the wearable device 101 based on the execution of the pass-through function may be maintained while identifying the sound from the audio signal or while identifying the user 110's interaction with the pass-through region. For example, the wearable device 101 may maintain executing the pass-through function based on an input for identifying a user's motion associated with an external object in which sound is generated through the pass-through region or ceasing display of the screen 130 based on the VR.

For example, in case that the user 110 wearing the wearable device 101 performs motion to remove the pass-through region, the wearable device 101 may cease executing the pass-through function. Motion for removing the pass-through region may include a motion for selecting an icon (e.g., an icon that contains a character and/or image in the form of "X") displayed together with the pass-through region. Referring to FIGS. 5A to 5E, icons 512, 523, and 532 displayed together with the pass-through region and for receiving an input for removing the pass-through region are exemplarily illustrated. In response to an input associated with the icons 512, 523, and 532, the wearable device 101 may cease displaying the pass-through region. For example, based on the input, the wearable device 101 may enter the state of FIG. 4 from the states 501, 502, 503, and 504 of FIGS. 5A to 5D. After providing the pass-through region, in case that the motion of the user 110 associated with the pass-through region is not identified for designated time, the wearable device 101 may cease executing the pass-through function.

Hereinafter, an example of an operation of the wearable device 101 that executes the pass-through function based on sound repeatedly generated from the external object will be described with reference to FIGS. 6 to 7.

FIG. 6 illustrates an example of a flowchart of a wearable device according to an embodiment. A wearable device 101 of FIGS. 1 and 2 and/or a processor 210 of FIG. 2 may perform operations described with reference to FIG. 6. The operations of FIG. 6 may be associated with operations of FIGS. 3A to 3C.

Referring to FIG. 6, in operation 610, according to an embodiment, a processor of the wearable device may display a visual object corresponding to an external object based on a pass-through function. The visual object of the operation 610 may include a portion 150 of FIG. 1, a screen 510 of FIG. 5A, a portion 522 in a screen 520 of FIG. 5B, a portion 530 of FIGS. 5C and 5D, and/or a virtual object 552 of FIG. 5E. As described above with reference to FIGS. 3A to 3C, the visual object may be displayed in response to detecting sound generated from the external object. The visual object may be displayed to provide an AR associated with the external object. For example, the visual object may be displayed together with a screen (e.g., a screen 130 of FIG. 1) for a VR disconnected from an external space.

Referring to FIG. 6, in operation 620, according to an embodiment, the processor of the wearable device may determine whether, from an audio signal, the sound generated from the external object is repeatedly identified. In case that the sound is not repeatedly generated (620—No), the processor may maintain performing the operation 610. In case that the sound is repeatedly generated (620—Yes), the processor may perform operation 630.

Referring to FIG. 6, in the operation 630, according to an embodiment, the processor of the wearable device may determine whether the user's motion associated with the visual object is identified. For example, the processor may identify the user's gaze toward the visual object displayed on the display based on the operation 610. For example, the processor may identify the user's hand gesture associated with the visual object. The hand gesture may include a pointing gesture of spreading a designated finger (e.g., index finger) toward the visual object and/or an external object corresponding to the visual object and folding other fingers different from the designated finger. The hand gesture may include a pinch gesture of pinching the visual object and/or the external object with two fingers (e.g., index finger and thumb). For example, the processor may identify the direction of the user's head toward the visual object. For example, the processor may identify a user input associated with the visual object based on a remote controller connected to the wearable device. Based on identifying the user's motion exemplified above (630—Yes), the processor may perform operation 650. In case that the motion of the user is not identified (630—No), the processor may perform operation 640.

Referring to FIG. 6, in the operation 640, according to an embodiment, the processor of the wearable device may reduce an importance level of the external object and may change at least a portion of the display on which the visual object is displayed. The processor may reduce the importance level of the external object in object information (e.g., object information 290 of FIG. 2) stored in memory (e.g., memory 215 of FIG. 2). In case that the user's motion associated with the visual object is not identified even though sound is repeatedly generated from the external object, the processor may reduce the importance level of the external object based on the operation 640.

In the operation 640, the processor may change a location, size, color, and/or transparency of the visual object displayed based on the operation 610. For example, based on reduced importance, the processor may reduce the size of the visual object. For example, the processor may increase the transparency based on the importance level. As the transparency of the visual object increases, visibility of the visual object in the screen may be reduced. For example, the processor may change the color of the visual object to a color corresponding to a reduced importance level. The embodiment is not limited thereto, and in the operation 640, the processor may reduce a width, height, size, and/or area of a region (e.g., a region 530 of FIG. 5C) for providing the external object based on the pass-through function of the operation 610.

Referring to FIG. 6, in the operation 650, the processor of the wearable device according to an embodiment may increase the importance level of the external object and may change at least a portion of the display on which the visual object is displayed. The processor may increase the importance level of the external object in the object information stored in the memory. In case that the sound is repeatedly generated from the external object and the motion associated with the visual object is identified, the processor may increase the importance level of the external object based on the operation 650. According to one or more embodiments, the type or intensity of motion of the user can be used to adjust the importance level of the external object. For example, if the user turns the user's head towards the object and makes a hand gesture towards the external object, the importance level of the external object may be increased more than if the user only turned the user's head or made a hand gesture (but not both). As another example, the intensity of the motion can be used to increase or decrease the importance level. For example, if the user moves the user's head towards the object more quickly than a threshold, the importance level of the external object may be increased, while the importance level is decreased if the user moves the user's head more slowly than the threshold. In some cases, the user's motion can be used to decrease the importance level of the external object. For example, if the user turns the user's head away from the visual object, the importance level of the external object may be decreased.

In the operation 650, the processor may change the location, size, color, and/or transparency of the visual object displayed based on the operation 610. For example, the processor may emphasize the visual object. Based on the increased importance level, the processor may increase the size of the visual object. The processor may reduce the transparency of the visual object based on the increased importance level. Based on the decrease in the transparency, the visibility of the visual object in the screen may be improved. The processor may change the color of the visual object to a color corresponding to the increased importance level. The embodiment is not limited thereto, and in the operation 650, the processor may increase the width, height, size, and/or area of a region (e.g., the region 530 of FIG. 5C) for providing the external object based on the pass-through function of the operation 610.

As described above with reference to FIG. 6, in case that the sound is repeatedly generated from the external object, the processor may change the pass-through region associated with the external object based on at least one of the number of times the sound is repeatedly generated and/or the user's interaction associated with the pass-through region. In case that the sound is repeatedly generated, time for which the pass-through region is displayed may increase. In case that the sound is repeatedly generated, a size of the pass-through region may increase. The processor may display a visual object (e.g., a visual object containing designated text such as "not to look again") for limiting the display of the pass-through region together with the pass-through region. The visual object may include icons 512, 523, and 532 of FIGS. 5A to 5E.

Hereinafter, an example of a UI displayed by a wearable device that identified an external object in which the sound is repeatedly generated will be described with reference to FIG. 7.

Figure 7:
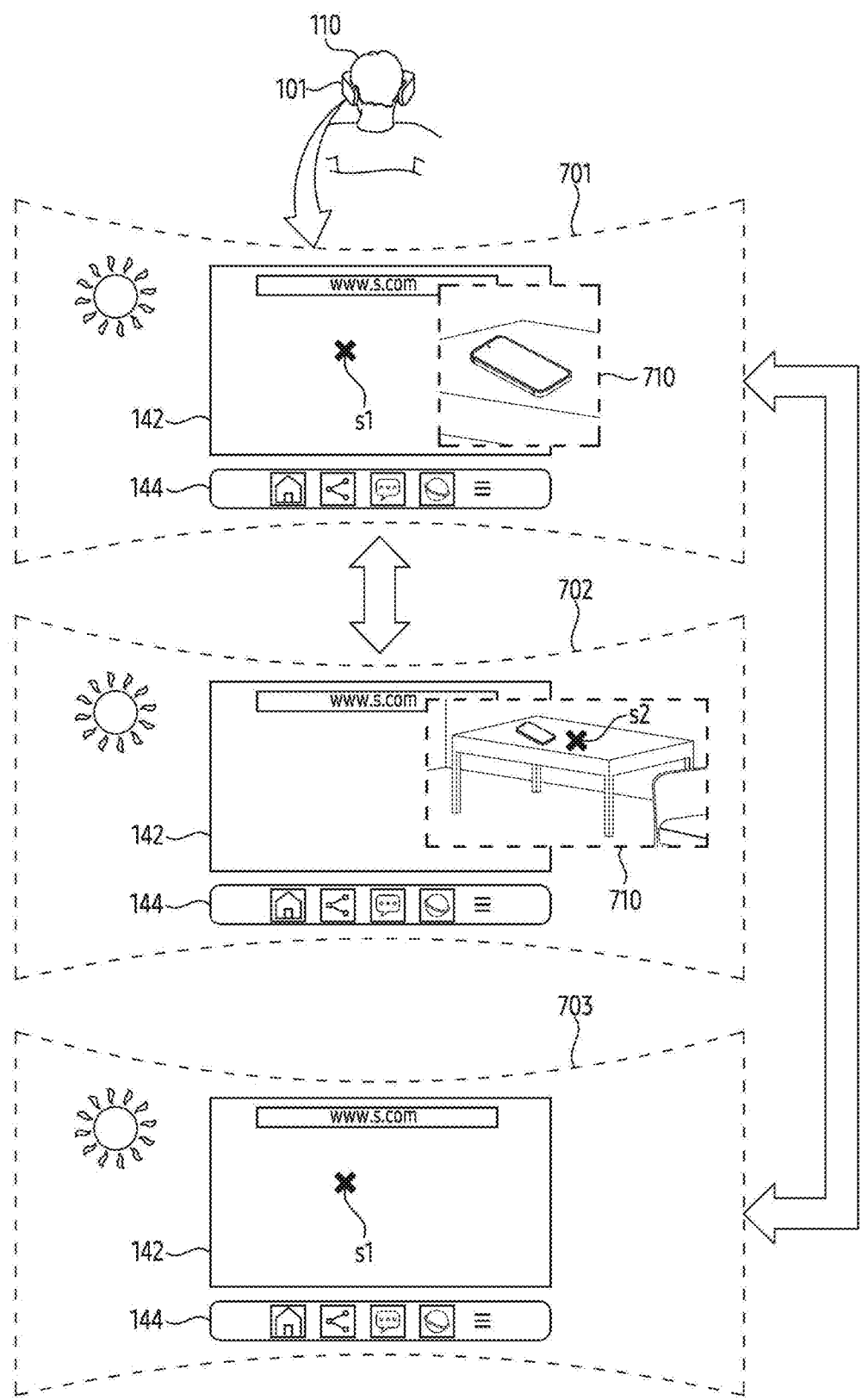
FIG. 7 illustrates an example of an operation of a wearable device associated with a repeatedly generated sound.

FIG. 7 illustrates an example of an operation of a wearable device 101 associated with a repeatedly generated sound. The wearable device 101 of FIGS. 1 and 2 and/or a processor 210 of FIG. 2 may perform an operation described with reference to FIG. 7. The operation of the wearable device 101 described with reference to FIG. 7 may be related to operations of FIGS. 3A to 3C, and/or FIG. 6.

Referring to FIG. 7, screens 701, 702, and 703 of the wearable device 101 that identified sound generated from an external object that is a smartphone are illustrated. The wearable device 101 that identified an external object corresponding to sound identified from an audio signal based on scene understanding (SU) may display a pass-through region 710 associated with the external object in a screen 701 including virtual objects 142 and 144. In case that the wearable device 101 includes displays configured to block ambient light, the pass-through region 710 may be formed by displaying a portion of an image and/or video obtained from a camera (e.g., a camera 225 and/or an outward camera 225-2) of the wearable device 101. In case that the wearable device 101 includes lenses configured to transmit the ambient light and a configuration (e.g., a projection assembly) for projecting light to the lenses, the pass-through region 710 may be formed by partially ceasing projecting the light.

In the screen 701 of FIG. 7, the pass-through region 710 in the screen 701 formed by the wearable device 101 may be associated with the importance level of the sound identified from the audio signal. The importance level may be changed based on identifying the motion of the user 110 associated with the pass-through region 710. The motion of the user 110 may be related to a point s1 at which the user 110's gaze reaches in the screen 701. For example, the wearable device 101 may recognize the point s1 at which the user 110's gaze reaches in the screen 701 by using an image and/or video of at least one of the user's two eyes. For example, the wearable device 101 may check the point s1 based on execution of a gaze tracker 274 of FIG. 2.

The wearable device 101 that identified the point s1 located outside the pass-through region 710 may determine that the user 110 does not gaze at the pass-through region 710. In a case in which the user 110 does not gaze at the pass-through region 710 for a designated period, the wearable device 101 may reduce the importance level of the external object based on operation 640 of FIG. 6. In the case, the wearable device 101 may reduce the pass-through region 710, and/or may increase transparency. For example, like a screen 703, the wearable device 101 may cease displaying the pass-through region 710. Despite identifying the sound repeatedly generated from the external object, the wearable device 101 may cease displaying the pass-through region 710, like the screen 703.

In the screen 701 including the pass-through region 710, the wearable device 101 may increase the size of the pass-through region 710 in response to checking and/or identifying the user 110's gaze moving into the pass-through region 710. Referring to FIG. 7, in a case in which the user 110's gaze faces the point s2 located in the pass-through region 710, the wearable device 101 may display the pass-through region 710 having an increased size, like a screen 702. In the case, the wearable device 101 may enlarge the pass-through region 710 or may reduce the transparency based on operation 650 of FIG. 6.

As described above, according to an embodiment, the wearable device 101 may change the importance level of the external object based on the interaction between the pass-through region 710 and the user 110 based on repeatedly identifying the sound generated by the external object. In case that the interaction occurs, the wearable device 101 may increase the importance level of the external object. In case that no interaction occurs (e.g., in case that it does not occur beyond a designated period), the wearable device 101 may reduce the importance level of the external object. According to one or more embodiments, the wearable device 101 may increase or decrease the importance level of the external object depending on how long the user gazed at the point s2. For example, if the user gazes at the point s2 for more than a threshold amount of time, the importance level of the external object may be increased. However, if the user gazes at the point s2 less than a threshold amount of time, the importance level of the external object may be decreased. The wearable device 101 may display the pass-through region 710 having a size proportional to the importance level together with a VR-based screen (e.g., screens 701, 702, and 703).

As described above, according to an embodiment, the wearable device 101 may detect sound generated in an external space while providing a user experience that blocks the ambient light and/or external sound based on the VR. Based on the detected sound, the wearable device 101 may display a visual object and/or a second screen corresponding to at least a portion of the external space in a first screen based on the VR. The wearable device 101 may more accurately determine whether to display the visual object and/or the second screen by using object information (e.g., object information based on the scene understanding (SU). For example, based on whether the sound identified from the audio signal is generated by an external object recognized by the object information, the wearable device 101 may display the visual object and/or the second screen. Thus, instead of unconditionally executing a pass-through function based on identifying sound of a designated size (e.g., a threshold size indicated by a decibel), the wearable device 101 may execute the pass-through function based on accurately segmenting the image and/or video corresponding to the external object generating the sound.

Hereinafter, an exemplary exterior of the wearable device 101 described with reference to FIGS. 1 to 7 is illustrated with reference to FIGS. 8A, 8B, 9A, and/or 9B. A wearable device 800 of FIGS. 8A and/or 8B and/or a wearable device 900 of FIGS. 9A and/or 9B may be an example of the wearable device 101 of FIG. 1.

Figure 8A:
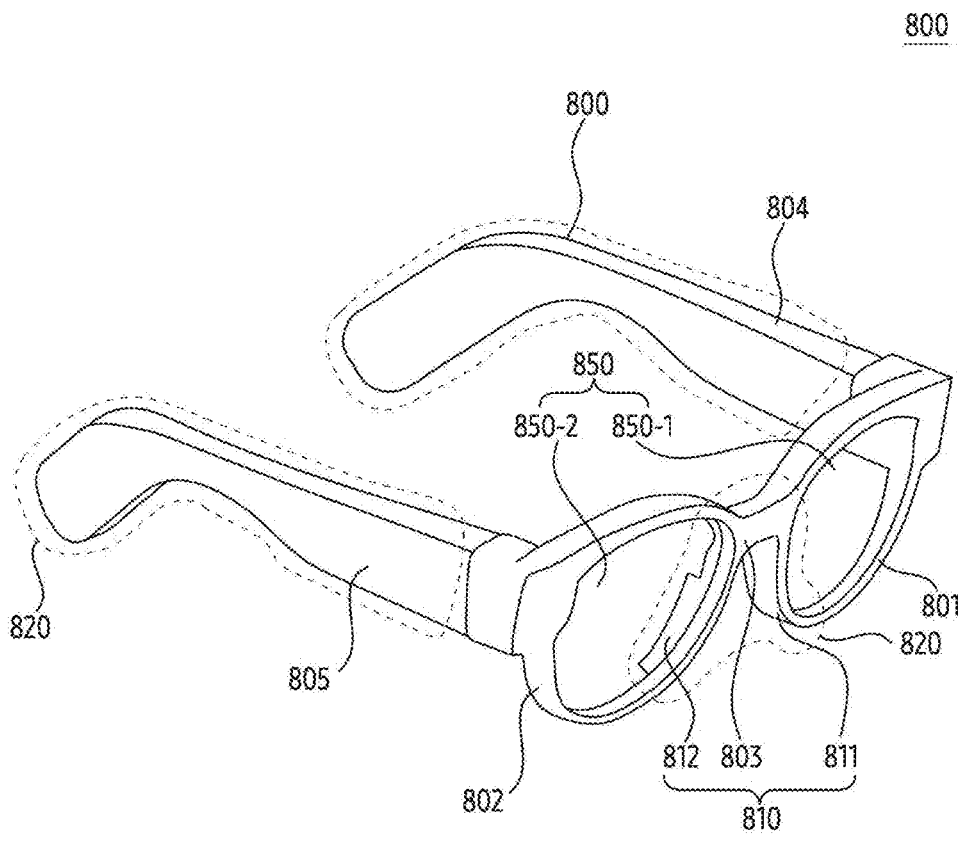
FIG. 8A illustrates an example of a perspective view of a wearable device according to an embodiment.

FIG. 8A illustrates an example of a perspective view of a wearable device according to an embodiment. According to an embodiment, a wearable device 800 may have a form of glasses that are wearable on a user's body part (e.g., head). The wearable device 800 may include a head-mounted display (HMD). For example, a housing of the wearable device 800 may include a flexible material such as rubber and/or silicon having a form that closely adheres to a portion of the user's head (e.g., a portion of the face surrounding both eyes). For example, the housing of the wearable device 800 may include one or more straps that are able to be twined around the user's head and/or one or more temples that are attachable to the ears of the head.

Referring to FIG. 8A, according to an embodiment, the wearable device 800 may include at least one display 850 and a frame supporting the at least one display 850.

According to an embodiment, the wearable device 800 may be worn on a portion of the user's body. The wearable device 800 may provide augmented reality (AR), virtual reality (VR), or mixed reality (MR) in which augmented reality and virtual reality are mixed, to the user wearing the wearable device 800. For example, the wearable device 800 may display a virtual reality image provided from at least one optical device 882 and 884 of FIG. 8B on the at least one display 850, in response to a user's designated gesture obtained through action recognition cameras 860-2 and 860-3 of FIG. 8B.

According to an embodiment, the at least one display 850 may provide visual information to the user. For example, the at least one display 850 may include a transparent or translucent lens. The at least one display 850 may include a first display 850-1 and/or a second display 850-2 spaced apart from the first display 850-1. For example, the first display 850-1 and the second display 850-2 may be disposed at locations corresponding to the user's left and right eyes, respectively.

Figure 8B:
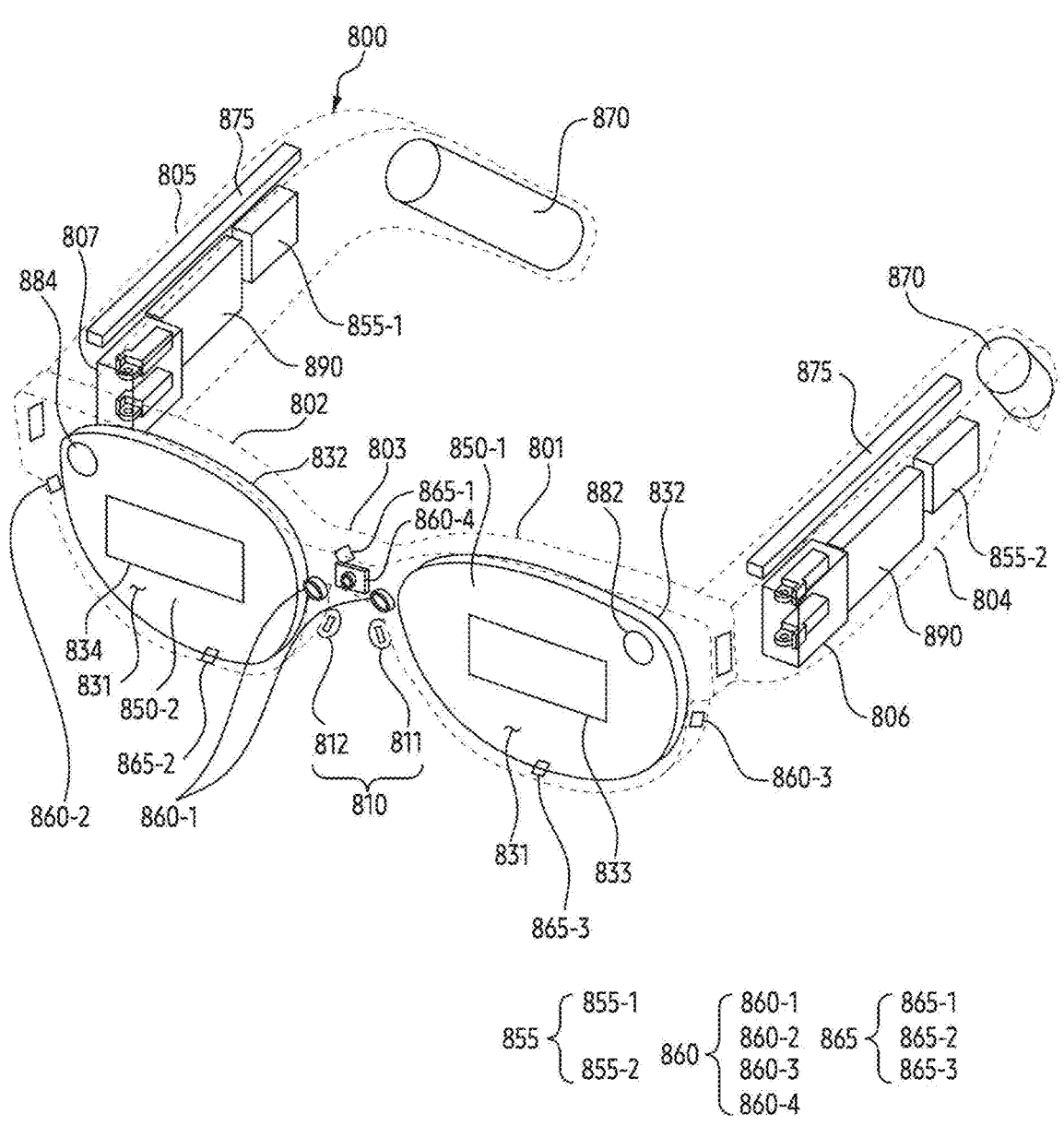
FIG. 8B illustrates an example of one or more hardware disposed in a wearable device according to an embodiment.

Referring to FIG. 8B, the at least one display 850 may provide visual information transmitted from ambient light and other visual information distinct from the visual information to the user through the lens included in the at least one display 850. The lens may be formed based on at least one of a fresnel lens, a pancake lens, or a multi-channel lens. For example, the at least one display 850 may include a first surface 831 and a second surface 832 opposite to the first surface 831. A displaying region may be formed on the second surface 832 of the at least one display 850. When the user wears the wearable device 800, the ambient light may be transmitted to the user by being incident on the first surface 831 and penetrated through the second surface 832. For another example, the at least one display 850 may display an augmented reality image in which the virtual reality image provided from the at least one optical device 882 and 884 is combined with a reality screen transmitted through the ambient light, on the displaying region formed on the second surface 832.

In an embodiment, the at least one display 850 may include at least one waveguide 833 and 834 that diffracts light transmitted from the at least one optical device 882 and 884 and transmits the diffracted light to the user. The at least one waveguide 833 and 834 may be formed based on at least one of glass, plastic, or polymer. A nano pattern may be formed on at least a portion of the outside or inside of the at least one waveguide 833 and 834. The nano pattern may be formed based on a grating structure having a shape of a polygon and/or a curved surface. Light incident to one end of the at least one waveguide 833 and 834 may be propagated to the other end of the at least one waveguide 833 and 834 by the nano pattern. The at least one waveguide 833 and 834 may include at least one of at least one diffractive element (e.g., a diffractive optical element (DOE), a holographic optical element (HOE)) or a reflective element (e.g., a reflective mirror). For example, the at least one waveguide 833 and 834 may be disposed in the wearable device 800 to guide a screen displayed by the at least one display 850 to the user's eyes. For example, the screen may be transmitted to the user's eyes based on total internal reflection (TIR) generated in the at least one waveguide 833 and 834.

The wearable device 800 may analyze an object included in a reality image collected through a photographing camera 860-4, combine a virtual object corresponding to an object that becomes a subject of augmented reality provision among the analyzed objects, and display it on the at least one display 850. The virtual object may include at least one of text and images for various information associated with the object included in the reality image. The wearable device

800 may analyze the object based on a multi-camera such as a stereo camera. For the object analysis, the wearable device 800 may execute space recognition (e.g., simultaneous localization and mapping (SLAM) by the multi-camera and/or time-of-flight (ToF). The user wearing the wearable device 800 may watch the image displayed on the at least one display 850.

According to an embodiment, the frame may be configured with a physical structure in which the wearable device 800 may be worn on the user's body. According to an embodiment, the frame may be configured such that when the user wears the wearable device 800, the first display 850-1 and the second display 850-2 may be positioned corresponding to the user's left and right eyes. The frame may support the at least one display 850. For example, the frame may support the first display 850-1 and the second display 850-2 to be positioned at positions corresponding to the user's left and right eyes.

Referring to FIG. 8A, the frame may include a region 820 at least a portion of which is in contact with the portion of the user's body, in case that the user wears the wearable device 800. For example, the region 820 in contact with the portion of the user's body of the frame may include a region in contact with a portion of a user's nose, a portion of a user's ear, and a portion of a side surface of a user's face, that the wearable device 800 contacts. According to an embodiment, the frame may include a nose pad 810 that is contacted on the portion of the user's body. When the wearable device 800 is worn by the user, the nose pad 810 may be contacted on the portion of the user's nose. The frame may include a first temple 804 and a second temple 805 that is contacted on another portion of the user's body that is distinct from the portion of the user's body.

For example, the frame may include a first rim 801 surrounding at least a portion of the first display 850-1, a second rim 802 surrounding at least a portion of the second display 850-2, a bridge 803 disposed between the first rim 801 and the second rim 802, a first pad 811 disposed along a portion of the edge of the first rim 801 from one end of the bridge 803, a second pad 812 disposed along a portion of the edge of the second rim 802 from the other end of the bridge 803, the first temple 804 extending from the first rim 801 and fixed to a portion of the wearer's ear, and the second temple 805 extending from the second rim 802 and fixed to a portion of the ear opposite to the ear. The first pad 811 and the second pad 812 may be in contact with the portion of the user's nose, and the first temple 804 and the second temple 805 may be in contact with a portion of the user's face and the portion of the user's ear. The temples 804 and 805 may be rotatably connected to the rim through hinge units 806 and 807 of FIG. 8B. The first temple 804 may be rotatably connected with respect to the first rim 801 through the first hinge unit 806 disposed between the first rim 801 and the first temple 804. The second temple 805 may be rotatably connected with respect to the second rim 802 through the second hinge unit 807 disposed between the second rim 802 and the second temple 805. According to an embodiment, the wearable device 800 may identify an external object (e.g., a user's fingertip) touching the frame and/or a gesture performed by the external object by using a touch sensor, a grip sensor, and/or a proximity sensor formed on at least a portion of a surface of the frame.

According to an embodiment, the wearable device 800 may include hardware (e.g., hardware described above based on the block diagram of FIG. 2) that performs various functions. For example, the hardware may include a battery module 870, an antenna module 875, the at least one optical device 882 and 884, speakers (e.g., speakers 855-1 and 855-2), a microphone (e.g., microphones 865-1, 865-2, and 865-3), a light emitting module, and/or a printed circuit board (PCB) 890 (e.g., a printed circuit board). Various hardware components may be disposed in the frame.

According to an embodiment, the microphone (e.g., the microphones 865-1, 865-2, and 865-3) of the wearable device 800 may obtain a sound signal, by being disposed on at least a portion of the frame. The first microphone 865-1 disposed on the bridge 803, the second microphone 865-2 disposed on the second rim 802, and the third microphone 865-3 disposed on the first rim 801 are illustrated in FIG. 8B, but the number and disposition of the microphones 865 are not limited to an embodiment of FIG. 8B. In case that the number of microphones 865 included in the wearable device 800 is two or more, the wearable device 800 may identify the direction of the sound signal by using a plurality of microphones disposed on different portions of the frame.

According to an embodiment, the at least one optical device 882 and 884 may project the virtual object to the at least one display 850, in order to provide various image information to the user. For example, the at least one optical device 882 and 884 may be a projector. The at least one optical device 882 and 884 may be disposed adjacent to the at least one display 850 or may be included in the at least one display 850 as a portion of the at least one display 850. According to an embodiment, the wearable device 800 may include a first optical device 882 corresponding to the first display 850-1 and a second optical device 884 corresponding to the second display 850-2. For example, the at least one optical device 882 and 884 may include the first optical device 882 disposed at an edge of the first display 850-1 and the second optical device 884 disposed at an edge of the second display 850-2. The first optical device 882 may transmit light to the first waveguide 833 disposed on the first display 850-1, and the second optical device 884 may transmit light to the second waveguide 834 disposed on the second display 850-2.

In an embodiment, a camera 860 may include the photographing camera 860-4, an eye tracking camera (ET CAM) 860-1, and/or the action recognition cameras 860-2 and 860-3. The photographing camera 860-4, the eye tracking camera (ET CAM) 860-1, and the action recognition cameras 860-2 and 860-3 may be disposed at different locations on the frame and may perform different functions. The eye tracking camera (ET CAM) 860-1 (e.g., an eye tracking camera 225-1 of FIG. 2) may output data indicating an eye location or the gaze of the user wearing the wearable device 800. For example, the wearable device 800 may detect the gaze from an image including a user's pupil obtained through the eye tracking camera (ET CAM) 860-1.

The wearable device 800 may identify an object (e.g., a real object, and/or a virtual object) focused by the user by using the user's gaze obtained through the eye tracking camera (ET CAM) 860-1. The wearable device 800 that identified the focused object may execute a function (e.g., gaze interaction) for interaction between the user and the focused object. The wearable device 800 may represent a portion corresponding to the eye of the avatar indicating the user in the virtual space by using the user's gaze obtained through the eye tracking camera (ET CAM) 860-1. The wearable device 800 may render an image (or screen) displayed on the at least one display 850 based on the location of the user's eye.

For example, visual quality of a first region related to the gaze (e.g., gaze corresponding to the points s1 and s2 of FIG. 7) in the image and visual quality (e.g., resolution, brightness, saturation, grayscale, and pixels per inch (PPI)) of a second region distinct from the first region may be different from each other. The wearable device 800 may obtain an image having the visual quality of the first region and the visual quality of the second region matching the user's gaze by using foveated rendering. For example, in case that the wearable device 800 supports an iris recognition function, user authentication may be performed based on iris information obtained using the eye tracking camera (ET CAM) 860-1. An example in which the eye tracking camera (ET CAM) 860-1 is disposed toward the user's right eye is illustrated in FIG. 8B, but the embodiment is not limited thereto, and the eye tracking camera (ET CAM) 860-1 may be disposed alone toward the user's left eye, or may be disposed toward both eyes.

In an embodiment, the photographing camera 860-4 may photograph a real image or background to be matched with a virtual image in order to implement the augmented reality or mixed reality content. The photographing camera 860-4 may be used to obtain an image having a high resolution based on a high resolution (HR) or a photo video (PV). The photographing camera 860-4 may photograph an image of a specific object existing at a location viewed by the user and may provide the image to the at least one display 850. The at least one display 850 may display one image in which a virtual image provided through the at least one optical device 882 and 884 is overlapped with information on the real image or background including an image of the specific object obtained by using the photographing camera 860-4. The wearable device 800 may compensate for depth information (e.g., a distance between the wearable device 800 and an external object obtained through a depth sensor) by using an image obtained through the photographing camera 860-4. The wearable device 800 may perform object recognition through the image obtained using the photographing camera 860-4. The wearable device 800 may perform a function (e.g., auto focus) and/or an optical image stabilization (OIS) function (e.g., an anti-shaking function) of focusing on an object (or subject) in the image by using the photographing camera 860-4. The wearable device 800 may perform a pass-through function for displaying an image obtained through the photographing camera 860-4 overlapping at least a portion of the screen, while displaying a screen indicating the virtual space on the at least one display 850. In an embodiment, the photographing camera 860-4 may be disposed on the bridge 803 disposed between a first rim 801 and a second rim 802.

The eye tracking camera (ET CAM) 860-1 may implement a more realistic augmented reality by matching the user's gaze with the visual information provided on the at least one display 850 by tracking the gaze of the user wearing the wearable device 800. For example, when the user looks at the front, the wearable device 800 may naturally display environment information associated with the user's front on the at least one display 850 at the location where the user is located. The eye tracking camera (ET CAM) 860-1 may be configured to capture an image of the user's pupil in order to determine the user's gaze. For example, the eye tracking camera (ET CAM) 860-1 may receive gaze detection light reflected from the user's pupil and may track the user's gaze based on the location and movement of the received gaze detection light. In an embodiment, the eye tracking camera (ET CAM) 860-1 may be disposed at a location corresponding to the user's left and right eyes. For example, the eye tracking camera (ET CAM) 860-1 may be disposed in the first rim 801 and/or the second rim 802 to face the direction in which the user wearing the wearable device 800 is located.

The action recognition cameras 860-2 and 860-3 may provide a specific event to the screen provided on the at least one display 850 by recognizing the movement of the whole or portion of the user's body, such as the user's torso, hand, or face and the like. The action recognition cameras 860-2 and 860-3 may obtain a signal corresponding to the action by recognizing the user's gesture (e.g., gesture recognition), and may provide a display corresponding to the signal to the at least one display 850. The processor may identify a signal corresponding to the action and may perform a designated function based on the identification. The action recognition cameras 860-2 and 860-3 may be used to perform a space recognition function using SLAM and/or a depth map for 6 degrees of freedom pose (6 dof force). The processor may perform a gesture recognition function and/or an object tracking function by using the action recognition cameras 860-2 and 860-3. In an embodiment, the action recognition cameras 860-2 and 860-3 may be disposed on the first rim 801 and/or the second rim 802.

In an embodiment, the camera 860 included in the wearable device 800 is not limited to the above-described eye tracking camera (ET CAM) 860-1 and the action recognition cameras 860-2 and 860-3. For example, the wearable device 800 may identify an external object included in the FoV by using the camera disposed toward the user's FoV. That the wearable device 800 identifies the external object may be performed based on a sensor for identifying a distance between the wearable device 800 and the external object, such as a depth sensor and/or a time of flight (ToF) sensor. The camera 860 disposed toward the FoV may support an autofocus function and/or an optical image stabilization (OIS) function. For example, the wearable device 800 may include the camera 860 (e.g., a face tracking (FT) camera) disposed toward the face in order to obtain an image including the face of the user wearing the wearable device 800.

Although not illustrated, according to an embodiment, the wearable device 800 may further include a light source (e.g., LED) that emits light toward a subject (e.g., the user's eyes, face, and/or the external object in the FoV) photographed by using the camera 860. The light source may include an LED having an infrared wavelength. The light source may be disposed on at least one of the frame, and the hinge units 806 and 807.

According to an embodiment, the battery module 870 may supply power to electronic components of the wearable device 800. In an embodiment, the battery module 870 may be disposed in the first temple 804 and/or the second temple 805. For example, the battery module 870 may be a plurality of battery modules 870. The plurality of battery modules 870, respectively, may be disposed on each of the first temple 804 and the second temple 805. In an embodiment, the battery module 870 may be disposed at an end of the first temple 804 and/or the second temple 805.

The antenna module 875 may transmit the signal or power to the outside of the wearable device 800 or may receive the signal or power from the outside. In an embodiment, the antenna module 875 may be disposed in the first temple 804 and/or the second temple 805. For example, the antenna module 875 may be disposed close to one surface of the first temple 804 and/or the second temple 805.

The speaker 855 may output a sound signal to the outside of the wearable device 800. A sound output module may be referred to as a speaker. In an embodiment, the speaker 855 may be disposed in the first temple 804 and/or the second temple 805 in order to be disposed adjacent to the ear of the user wearing the wearable device 800. For example, the speaker 855 may include the second speaker 855-2 disposed adjacent to the user's left ear by being disposed in the first temple 804, and the first speaker 855-1 disposed adjacent to the user's right ear by being disposed in the second temple 805.

The light emitting module (not illustrated) may include at least one light emitting element. The light emitting module may emit light of a color corresponding to a specific state or may emit light by an operation corresponding to the specific state in order to visually provide information on a specific state of the wearable device 800 to the user. For example, in case that the wearable device 800 needs charging, it may emit light which is red light at regular intervals. In an embodiment, the light emitting module may be disposed on the first rim 801 and/or the second rim 802.

Referring to FIG. 8B, according to an embodiment, the wearable device 800 may include the printed circuit board (PCB) 890. The PCB 890 may be included in at least one of the first temple 804 or the second temple 805. The PCB 890 may include an interposer disposed between at least two sub PCBs. On the PCB 890, one or more hardware (e.g., hardware illustrated by different blocks of FIG. 2) included in the wearable device 800 may be disposed. The wearable device 800 may include a flexible PCB (FPCB) for interconnecting the hardware.

According to an embodiment, the wearable device 800 may include at least one of a gyro sensor, a gravity sensor, and/or an acceleration sensor for detecting the posture of the wearable device 800 and/or the posture of a body part (e.g., a head) of the user wearing the wearable device 800. Each of the gravity sensor and the acceleration sensor may measure gravity acceleration, and/or acceleration based on designated 3-dimensional axes (e.g., x-axis, y-axis, and z-axis) perpendicular to each other. The gyro sensor may measure angular velocity of each of designated 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 800 may identify the user's motion and/or gesture performed to execute or cease a specific function of the wearable device 800 based on the IMU.

Figure 9A:
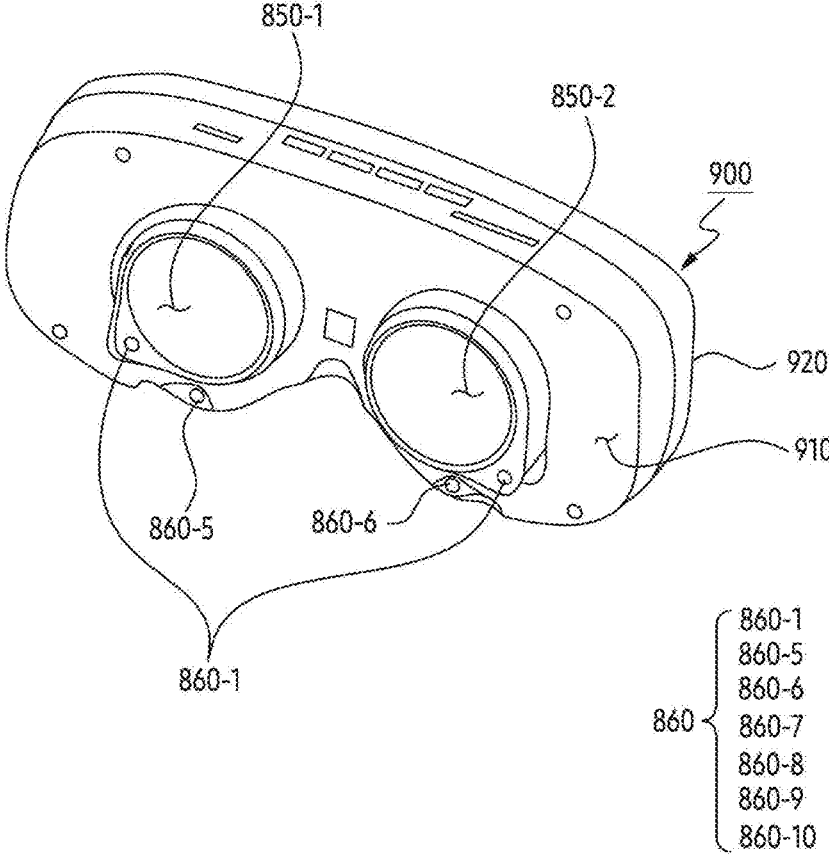
FIGS. 9A to 9B illustrate an example of exterior of a wearable device according to an embodiment.
Figure 9B:
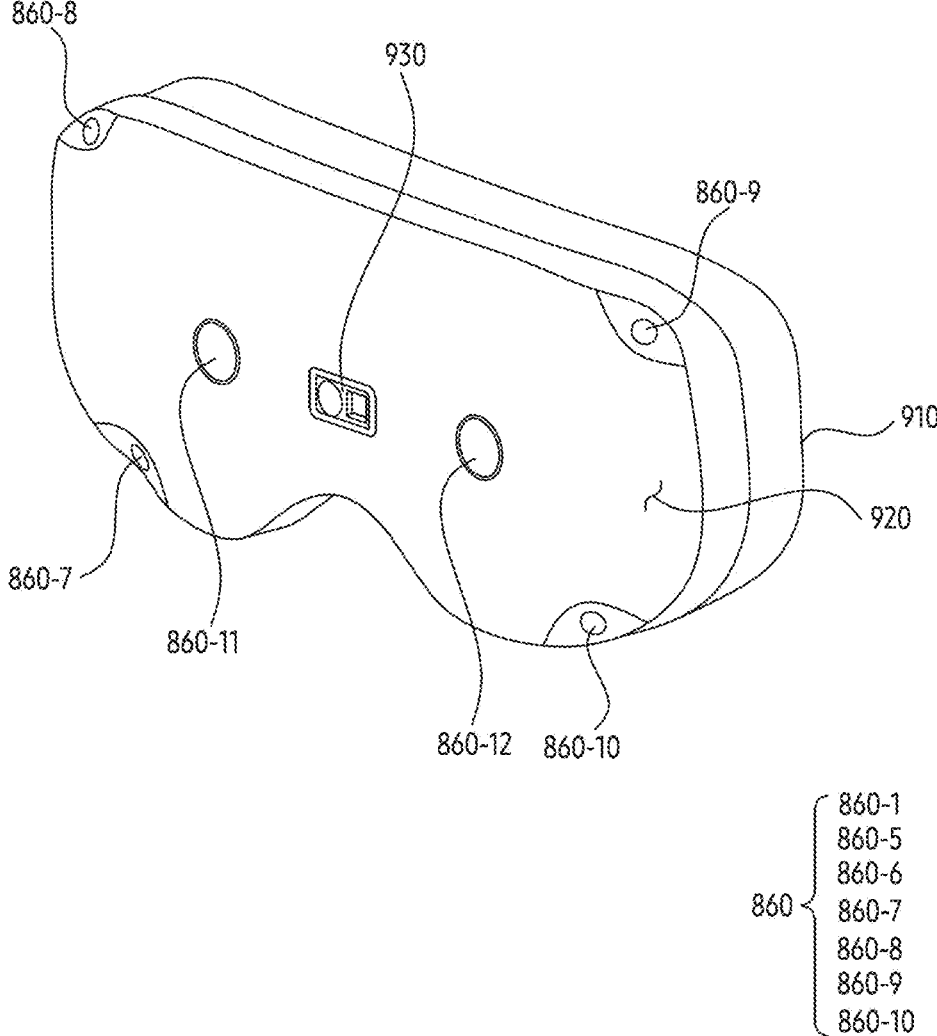

FIGS. 9A to 9B illustrate an example of exterior of a wearable device according to an embodiment. A wearable device 900 of FIGS. 9A to 9B may include at least a portion of the hardware of a wearable device 800 described with reference to FIGS. 8A and/or 8B. According to an embodiment, an example of exterior of a first surface 910 of a housing of the wearable device 900 may be illustrated in FIG. 9A, and an example of exterior of a second surface 920 opposite to the first surface 910 may be illustrated in FIG. 9B.

Referring to FIG. 9A, according to an embodiment, the first surface 910 of the wearable device 900 may have an attachable form on a user's body part (e.g., the user's face). Although not illustrated, the wearable device 900 may further include a strap for fixing on the user's body part and/or one or more temples (e.g., a first temple 804 and/or a second temple 805 of FIGS. 8A to 8B). A first display 850-1 for outputting an image to a left eye among both eyes of the user and a second display 850-2 for outputting an image to a right eye among both eyes may be disposed on the first surface 910. The wearable device 900 may further include rubber or silicon packing to prevent interference by light (e.g., ambient light) different from the light emitted from the first display 850-1 and the second display 850-2 which are formed on the first surface 910.

According to an embodiment, the wearable device 900 may include cameras 860-1 for photographing and/or tracking both eyes of the user adjacent to each of the first display 850-1 and the second display 850-2. The cameras 860-1 may be referred to as the eye tracking camera 860-1 of FIG. 8B. According to an embodiment, the wearable device 900 may include cameras 860-5 and 860-6 for photographing and/or recognizing the user's face. The cameras 860-5 and 860-6 may be referred to as FT cameras. The wearable device 900 may control an avatar representing the user in the virtual space based on a motion of the user's face identified using the cameras 860-5 and 860-6. For example, the wearable device 900 may change a texture and/or shape of a portion of the avatar (e.g., a portion of an avatar representing a person's face), by using information obtained by cameras 860-5 and 860-6 (e.g., FT camera) and representing facial expression of a user wearing the wearable device 900.

Referring to FIG. 9B, a camera (e.g., cameras 860-7, 860-8, 860-9, 860-10, 860-11, and 860-12) (e.g., an outward camera 225-2 of FIG. 2) for obtaining information related to an external environment of the wearable device 900, and/or a sensor (e.g., a depth sensor 930) may be disposed on the second surface 920 opposite to the first surface 910 of FIG. 9A. For example, the cameras 860-7, 860-8, 860-9, and 860-10 may be disposed on the second surface 920 to recognize an external object. The cameras 860-7, 860-8, 860-9, and 860-10 of FIG. 9B may correspond to the action recognition cameras 860-2 and 860-3 of FIG. 8B.

For example, using cameras 860-11 and 860-12, the wearable device 900 may obtain an image and/or video to be transmitted to each of both eyes of the user. The camera 860-11 may be disposed on the second surface 920 of the wearable device 900 to obtain an image to be displayed through the second display 850-2 corresponding to the right eye among both eyes. The camera 860-12 may be disposed on the second surface 920 of the wearable device 900 to obtain an image to be displayed through the first display 850-1 corresponding to the left eye among both eyes. The cameras 860-11 and 860-12 may correspond to the photographing camera 860-4 of FIG. 8B.

According to an embodiment, the wearable device 900 may include the depth sensor 930 disposed on the second surface 920 to identify the distance between the wearable device 900 and the external object. Using the depth sensor 930, the wearable device 900 may obtain spatial information (e.g., a depth map) for at least a portion of the FoV of the user wearing the wearable device 900. Although not illustrated, a microphone for obtaining sound outputted from the external object may be disposed on the second surface 920 of the wearable device 900. The number of microphones may be one or more according to the embodiment.

In an embodiment, a method of more accurately executing a pass-through function based on a location and/or direction of an external object generating sound may be required. As described above, according to an embodiment, a wearable device (e.g., a wearable device 101 of FIG. 1, a wearable device 800 of FIGS. 8A and 8B, and a wearable device 900 of FIGS. 9A and 9B) may include a camera (e.g., a camera 225 of FIG. 2), one or more microphones, a display (e.g., a display 220 of FIG. 2), memory (e.g., memory 215 of FIG. 2) comprising one or more storage mediums storing instructions, and at least one processor (e.g., a processor 210 of FIG. 2). The at least one processor may comprise processing circuitry, wherein the instructions, when executed by the at least one processor individually and/or collectively, cause the wearable device to obtain, while displaying a first screen (e.g., a screen 130 of FIG. 1) with respect to a virtual space on an entire displaying region of the display, an audio signal including sound of an external space by using the one or more microphones. The instructions, when executed by the at least one processor individually and/or collectively, cause the wearable device to identify, in response to detection of an external object (e.g., an external object 120 of FIG. 1) generating the sound by using the audio signal, data corresponding to the external object in information associated with the external space obtained based on the camera. The instructions, when executed by the at least one processor individually and/or collectively, cause the wearable device to, based on identifying the data in the information, display, together with the first screen in the displaying region, a second screen (e.g., a portion of FIG. 2) including a portion segmented from an image obtained from the camera based on the identified data. According to an embodiment, the wearable device may execute the pass-through function by using information associated with an external object, generated by using a camera.

For example, the instructions, when executed by the at least one processor individually and/or collectively, cause the wearable device to determine, by using a location of the external object with respect to the wearable device based on the identified data, at least one of a size or a location of the portion in the image.

For example, the instructions, when executed by the at least one processor individually and/or collectively, cause the wearable device to display the second screen having a size based on the data indicating an importance level of the external object on the display.

For example, the instructions, when executed by the at least one processor individually and/or collectively, cause the wearable device to change the importance level of the external object based on identifying motion of a user associated with the second screen.

For example, the instructions, when executed by the at least one processor individually and/or collectively, cause the wearable device to change, based on identifying the sound generated by the external object from the audio signal repeatedly, the importance level of the external object based on interaction between a user and the second screen.

For example, the information may be obtained by recognizing a plurality of external objects in which the external object is included by using the camera. The information may include data for distinguishing sounds generatable by each of the plurality of external objects.

For example, the instructions, when executed by the at least one processor individually and/or collectively, cause the wearable device to display the second screen having a size proportional to the importance level together with the first screen in the displaying region.

For example, the instructions, when executed by the at least one processor individually and/or collectively, cause the wearable device to display, in response to checking a location of the external object positioned in a portion different from portion of the external space corresponding to the image based on the data, the second screen including a visual object for guiding motion of a user toward the external object on the display.

For example, the instructions, when executed by the at least one processor individually and/or collectively, cause the wearable device to refrain from, based on determining that the data corresponding to the external object in the information is not identified, displaying the second screen associated with the external object generating the sound in the displaying region.

As described above, according to an embodiment, a method of a wearable device may comprise obtaining, while displaying a first screen with respect to a virtual space on an entire displaying region of a display of the wearable device, an audio signal including sound of an external space by using the one or more microphones. The method may comprise identifying, in response to detection of an external object generating the sound by using the audio signal, data corresponding to the external object in information associated with the external space obtained based on a camera of the wearable device. The method may comprise, based on identifying the data in the information, displaying, together with the first screen in the displaying region, a second screen including a portion segmented from an image obtained from the camera based on the identified data.

For example, the displaying may comprise determining, by using a location of the external object with respect to the wearable device based on the identified data, at least one of a size or a location of the portion in the image.

For example, the displaying may comprise displaying the second screen having a size based on the data indicating an importance level of the external object on the display.

For example, the displaying may comprise changing the importance level of the external object based on identifying motion of a user associated with the second screen.

For example, the displaying may comprise changing, based on identifying the sound generated by the external object from the audio signal repeatedly, the importance level of the external object based on interaction between a user and the second screen.

For example, the information may be obtained by recognizing a plurality of external objects in which the external object is included by using camera. The information may include data for distinguishing sounds generatable by each of the plurality of external objects.

For example, the displaying may comprise displaying the second screen having the size proportional to the importance level together with the first screen in the displaying region.

For example, the displaying may comprise displaying, in response to checking a location of the external object positioned in a portion different from portion of the external object corresponding to the image based on the data, the second screen including a visual object for guiding motion of a user toward the external object on the display.

For example, the method may comprise ceasing, based on determining that the data corresponding to the external object in the information is not identified, displaying the second screen associated with the external object generating the sound in the displaying region.

As described above, according to an embodiment, a wearable device may comprise a camera, one or more microphones, a display, memory having one or more storage mediums storing instructions, and at least one processor having processing circuitry. The instructions, when executed by the at least one processor individually and/or collectively, cause the wearable device to display a first screen based on a virtual reality (VR) in an entire displaying region of the display in a state obtaining information corresponding to a plurality of external objects by using the camera. The instructions, when executed by the at least one processor individually and/or collectively, cause the wearable device to obtain an audio signal by using the one or more microphones while displaying the first screen. The instructions, when executed by the at least one processor individually and/or collectively, cause the wearable device to, in response to detection of sound generated from a first external object among the plurality of external objects by using the audio signal, display, together with the first screen, a second screen including a first portion segmented from the image obtained from the camera based on a first size set to correspond to the first external object by the information. The instructions, when executed by the at least one processor individually and/or collectively, cause the wearable device to, in response to detection of sound generated from a second external object among the plurality of external objects by using the audio signal, displays, together with the first screen, a third screen including a second portion segmented from the image based on a second size set to correspond to the second external object by the information.

For example, the instructions, when executed by the at least one processor individually and/or collectively, cause the wearable device to segment the first portion having the first size from the image based on an importance level of the first external object included in the information. A location of the first portion in the image may correspond to a location of the first external object with respect to the wearable device indicated by the information.

For example, the instructions, when executed by the at least one processor individually and/or collectively, cause the wearable device to determine, based on comparing classes of each of the plurality of external objects indicated by the information and a class of an external object inferred from the audio signal, whether the external object inferred from the audio signal is corresponded to one of the plurality of external objects.

For example, the instructions, when executed by the at least one processor individually and/or collectively, cause the wearable device to display, in response to detecting sound generated by the first external object, the second screen together with the first screen to provide augmented reality (AR) associated with the first external object.

As described above, according to an embodiment, a method of a wearable device may comprise displaying a first screen based on a virtual reality in an entire displaying region of the display of the wearable device in a state obtaining information corresponding to a plurality of external objects by using the camera of the wearable device. The method may comprise obtaining an audio signal by using the one or more microphones of the wearable device while displaying the first screen. The method may comprise, in response to detection of sound generated from a first external object among the plurality of external objects by using the audio signal, displaying, together with the first screen, a second screen including a first portion segmented from the image obtained from the camera based on a first size set to correspond to the first external object by the information. The method may comprise, in response to detection of sound generated from a second external object among the plurality of external objects by using the audio signal, displaying, together with the first screen, a third screen including a second portion segmented from the image based on a second size set to correspond to the second external object by the information.

For example, the displaying the second screen together with the first screen may comprise segmenting the first portion having the first size from the image based on an importance level of the first external object included in the information. A location of the first portion in the image may correspond to a location of the first external object with respect to the wearable device indicated by the information.

For example, the obtaining may comprise determining, based on comparing classes of each of the plurality of external objects indicated by the information and a class of an external object inferred from the audio signal, whether the external object inferred from the audio signal is corresponded to one of the plurality of external objects.

For example, the displaying the second screen together with the first screen may comprise displaying, in response to detecting sound generated by the first external object, the second screen together with the first screen to provide augmented reality (AR) associated with the first external object.

For example, according to an embodiment, a non-transitory computer-readable storage medium may store one or more instructions that, when executed by the electronic device, cause the electronic device to perform the method and/or operation exemplified above.

The technical task to be achieved in the present document is not limited to the above-mentioned technical task, and other technical tasks not mentioned will be clearly understood by those who have ordinary knowledge in the technical field belonging to the present document.

The effect that may be obtained in the present disclosure is not limited to the above-mentioned effects, and other effects not mentioned will be clearly understood by those who have ordinary knowledge in the technical field to which the present disclosure belongs.

The device described above may be implemented as a hardware component, a software component, and/or a combination of a hardware component and a software component. For example, the devices and components described in the embodiments may be implemented by using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include may be those configured to store program instructions, including a magnetic medium such as a hard disk, floppy disk, and magnetic tape, optical recording medium such as a CD-ROM and DVD, magneto-optical medium, such as a floptical disk, and ROM, RAM, flash memory, and the like. In addition, examples of other media may include recording media or storage media managed by app stores that distribute applications, sites that supply or distribute various software, servers, and the like.

As described above, although the embodiments have been described with limited examples and drawings, a person who has ordinary knowledge in the relevant technical field is capable of various modifications and transform from the above description. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

Therefore, other implementations, other embodiments, and those equivalent to the scope of the claims are in the scope of the claims described later.

No claim element is to be construed under the provisions of 35 U.S.C. § 112, sixth paragraph, unless the element is expressly recited using the phrase "means for" or "means."

What is claimed is:

1. A wearable device, comprising:

a camera;

one or more microphones;

a display;

memory, comprising one or more storage mediums, storing instructions; and at least one processor comprising processing circuitry, wherein the instructions, when executed by the at least one processor individually and/or collectively, cause the wearable device to:

obtain, while a virtual space is displayed via the display and displaying an image obtained via the camera is disallowed, an audio signal using the one or more microphones;

based on the obtained audio signal being determined as output from an external object registered in the wearable device, search for a visual object corresponding to the external object from an image obtained via the camera; and based on the visual object being searched from an image via the camera, display, via the display, a portion of the image including the visual object, together with the virtual space for allowing the external object to be viewed through a portion of the virtual space.

2. The wearable device of claim 1, wherein the instructions, when executed by the at least one processor individually and/or collectively, cause the wearable device to:

determine a size of the portion of the image in accordance with a type of the external object registered in the wearable device.

3. The wearable device of claim 1, further comprising another camera arranged to face eyes of a user of the wearable device when worn;

wherein the instructions, when executed by the at least one processor individually and/or collectively, cause the wearable device to:

identify, via the another camera, a gaze of the user; and based on the gaze being identified as facing the visual object in the portion of image, increase a size of the portion of the image displayed together with the virtual space via the display.

4. The wearable device of claim 3, wherein the instructions, when executed by the at least one processor individually and/or collectively, cause the wearable device to:

based on the gaze being identified as positioned out of the visual object, decrease the size of the portion of the image displayed together with the virtual space via the display.

5. The wearable device of claim 4, wherein the instructions, when executed by the at least one processor individually and/or collectively, cause the wearable device to:

based on the gaze positioned out of the visual object being identified as maintained while a reference time, cease to display the portion of the image.

6. The wearable device of claim 1, wherein the instructions, when executed by the at least one processor individually and/or collectively, cause the wearable device to:

identify, via the camera, a motion of a user of the wearable device with respect to the external object; and based on identifying the motion, increase a size of the portion of the image displayed together with the virtual space via the display.

7. The wearable device of claim 1, wherein the instructions, when executed by the at least one processor individually and/or collectively, cause the wearable device to:

based on another audio signal obtained using the one or more microphones being determined as output from the external object while the portion of the image is displayed together with the virtual space, increase a size of the portion of the image displayed together with the virtual space via the display.

8. The wearable device of claim 1, wherein the instructions, when executed by the at least one processor individually and/or collectively, cause the wearable device to:

based on the visual object being not searched from the image, display a visual object for guiding a position at which the audio signal is output in the virtual space.

9. A method of a wearable device, comprising:

obtaining, while a virtual space is displayed via a display of the wearable device and displaying an image obtained via a camera of the wearable device is disallowed, an audio signal using one or more microphones of the wearable device;

based on the obtained audio signal being determined as output from an external object registered in the wearable device, searching for a visual object corresponding to the external object from an image obtained via the camera; and based on the visual object being searched from an image via the camera, displaying, via the display, a portion of the image including the visual object, together with the virtual space for allowing the external object to be viewed through a portion of the virtual space.

10. The method of claim 9, comprising:

determining a size of the portion of the image in accordance with a type of the external object registered in the wearable device.

11. The method of claim 9, comprising:

identifying, via another camera of the wearable device, a gaze of the user; and based on the gaze being identified as facing the visual object in the portion of image, increasing a size of the portion of the image displayed together with the virtual space via the display.

12. The method of claim 11, comprising:

based on the gaze being identified as positioned out of the visual object, decreasing the size of the portion of the image displayed together with the virtual space via the display.

13. The method of claim 12, comprising:

based on the gaze positioned out of the visual object being identified as maintained while a reference time, ceasing to display the portion of the image.

14. The method of claim 11, comprising:

identifying, via the camera, a motion of a user of the wearable device with respect to the external object; and based on identifying the motion, increasing a size of the portion of the image displayed together with the virtual space via the display.

15. The method of claim 11, comprising:

based on another audio signal obtained using the one or more microphones being determined as output from the external object while the portion of the image is displayed together with the virtual space, increasing a size of the portion of the image displayed together with the virtual space via the display.

16. The method of claim 9, comprising:

based on the visual object being not searched from the image, displaying a visual object for guiding a position at which the audio signal is output in the virtual space.

17. A non-transitory computer readable storage medium storing one or more programs, the one or more programs comprising instructions, when executed by a wearable device comprising a camera, one or more microphones, and a display, cause the head-wearable electronic device to:

obtain, while a virtual space is displayed via the display and displaying an image obtained via the camera is disallowed, an audio signal using the one or more microphones;

based on the obtained audio signal being determined as output from an external object registered in the wearable device, search for a visual object corresponding to the external object from an image obtained via the camera; and based on the visual object being searched from an image via the camera, display, via the display, a portion of the image including the visual object, together with the virtual space for allowing the external object to be viewed through a portion of the virtual space.

18. The non-transitory computer readable storage medium of claim 17, wherein the one or more programs comprising instructions, when executed by a wearable device to:

determine a size of the portion of the image in accordance with a type of the external object registered in the wearable device.

19. The non-transitory computer readable storage medium of claim 17, wherein the wearable device further comprises another camera arranged to face eyes of a user of the wearable device when worn, wherein the one or more programs comprising instructions, when executed by a wearable device to:

identify, via the another camera, a gaze of the user; and based on the gaze being identified as facing the visual object in the portion of image, increase a size of the portion of the image displayed together with the virtual space via the display.

20. The non-transitory computer readable storage medium of claim 19, wherein the one or more programs comprising instructions, when executed by a wearable device to:

based on the gaze being identified as positioned out of the visual object, decrease the size of the portion of the image displayed together with the virtual space via the display.

\*   \*   \*   \*   \*